USOO5638070A

United States Patent [19]
Kuwaoka

[11] Patent Number: 5,638,070
[45] Date of Patent: Jun. 10, 1997

[54] SIGNAL PROCESSING METHOD AND APPARATUS FOR TRANSFORMING N-BIT CODES TO M-BIT CODES WHEREIN M IS GREATER THAN N

[75] Inventor: Toshiharu Kuwaoka, Yokohama, Japan

[73] Assignee: Victor Company of Japan, Ltd., Yokohama, Japan

[21] Appl. No.: 515,208

[22] Filed: Aug. 15, 1995

[30] Foreign Application Priority Data

Aug. 16, 1994 [JP] Japan .................................. 6-213276

[51] Int. Cl.⁶ .................................................. H03M 7/20
[52] U.S. Cl. ............................. 341/95; 341/102; 341/88
[58] Field of Search ........................ 341/95, 102, 88, 341/131; 395/2.21, 2.22

[56] References Cited

U.S. PATENT DOCUMENTS

| 4,644,324 | 2/1987 | Araki et al. | 340/347 |
| 5,323,159 | 6/1994 | Imamura et al. | 341/145 |
| 5,448,237 | 9/1995 | Borgen et al. | 341/131 |

FOREIGN PATENT DOCUMENTS

| 5-304474 | 11/1993 | Japan . |
| 6-244678 | 9/1994 | Japan . |

Primary Examiner—Jeffrey A. Gaffin
Assistant Examiner—Jason H. Vick
Attorney, Agent, or Firm—Jacobson, Price, Holman & Stern, PLLC

[57] ABSTRACT

N-bit digital signals are transformed into M-bit digital signals (M>N), the N-bit signals being obtained by converting an analog signal into digital signals. Detected are transition points on a time axis and intervals between the transition points at which successive digital signals of the N-bit signals vary. (M-N) bit additional signals are generated which correct errors of the N-bit signals within a range of ±0.5 least significant bit of the N-bit signals in response to the transition points and the intervals. The additional signals are delayed so as to correspond to least significant bit of the N-bit signals. The delayed additional signals are combined with the N-bit signals to generate the M-bit signals. Instead of the transition points and intervals, detected are transition patterns of successive digital signals of the N-bit signals over transition points. (M-N) bit additional signals are generated which correct errors of the N-bit signals within a range of ±0.5 least significant bit of the N-bit signals based on the transition patterns. The additional signals are combined with the N-bit signals so that the additional signals correspond to the least significant bit of the N-bit signals, to generate the M-bit signals.

14 Claims, 25 Drawing Sheets

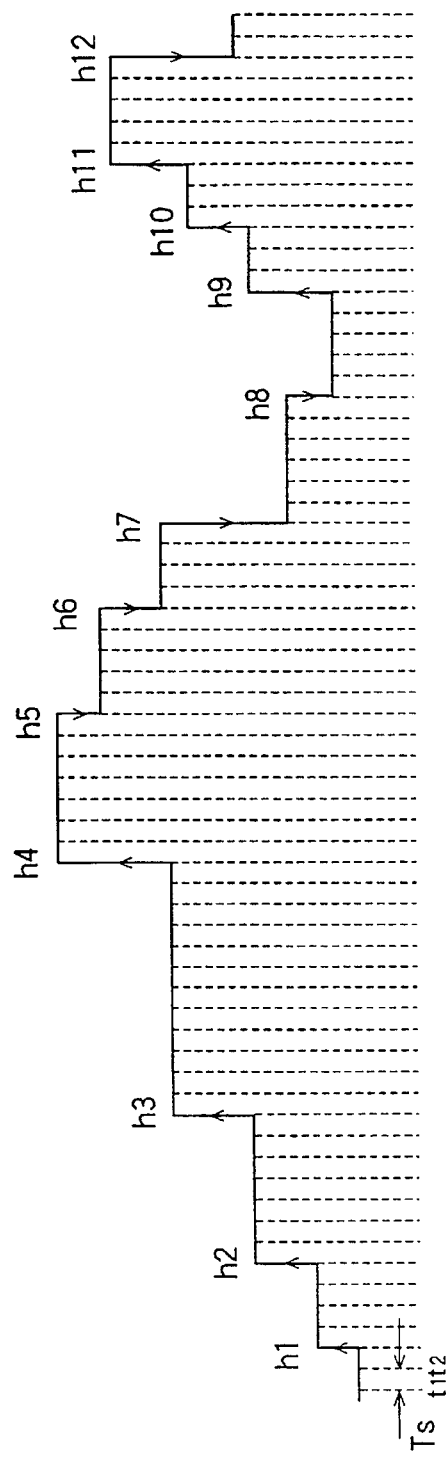
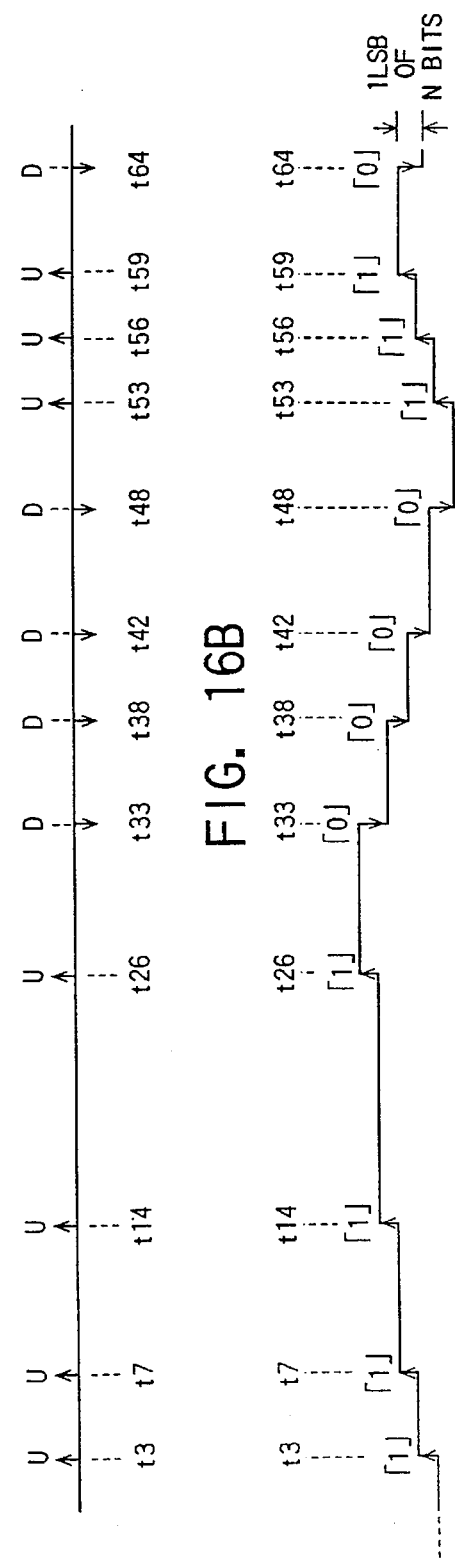
FIG. 16A
FIG. 16B
FIG. 16C

SIGNAL PROCESSING METHOD AND APPARATUS FOR TRANSFORMING N-BIT CODES TO M-BIT CODES WHEREIN M IS GREATER THAN N

BACKGROUND OF THE INVENTION

1. Field of the Invention

The present invention relates to a signal processing method and a signal processing apparatus, and more specifically to a method and apparatus for transforming N-bit codes such as audio signals, video signals, etc. into M-bit codes on the condition that M is larger than N.

2. Description of the Prior Art

In the case where signals such as audio or video signals are converted into digital signals, digital signals having a predetermined number of bits are generated per sample in conformity with a standard prescribed under due consideration of various conditions (e.g., transmission, fidelity of recording and reproduction, apparatus cost, etc.). For instance, in the case of a compact disk, 16-bit digital signals are recorded per sample.

In FIG. 1, a plurality of thick solid lines S as $a \rightarrow b \rightarrow c \rightarrow d \rightarrow \ldots k \rightarrow l \rightarrow m \rightarrow n$, represent digital signals obtained by quantizing an original analog signal (by resolution of $\frac{1}{2}^N$ for each specific sampling period Ts) in a form of analog signal. Here, the original analog signal resides in the ranges enclosed by dashed lines including the solid lines S shown in FIG. 1. In other words, there exists an error of less than ±0.5 LSB (the least significant bit) between the original analog signal and the restored analog signal (obtained by restoring the original analog signal). Therefore, in the N-bit digital signal obtained by converting the analog signal in the resolution of $\frac{1}{2}^N$, the minute signal as fine as is obtained by a resolution to more than $\frac{1}{2}^N$ cannot be restored. Further, in FIG. 1, t1, t2, t3, ... denote sequential sampling points, and Ts denotes a sampling period.

However, there exists so far a need to restore the minute signal using a resolution of more than a value determined by the number of bits of digital signals. Therefore, for instance, Japanese Published Unexamined (Kokai) Patent Application No. 5-304474 has proposed such a method of transforming N-bit codes into M-bit codes on the condition that M is larger than N. In a technique of increasing the number of bits disclosed in this prior art patent, digital signals are smoothed through a digital low-pass filter so that even the minute level signals can be DA (Digital-to-Analog) converted without distortion. In other words, data less than one LSB of the original number of bits can be outputted for DA conversion.

In this prior art technique, although the N-bit digital signals are converted into M-bit digital signals (M>N) by use of the digital low-pass filter, it is impossible to correct the errors of 0.5 LSB involved in the N-bit digital signals. In addition, since the digital low-pass filter is used for waveform smoothing, the signal waveform changes. As a result, when this method is applied to the DA conversion of audio digital signals, for instance, there exists a problem in that the quality of the audio digital signals varies.

SUMMARY OF THE INVENTION

The object of the present invention is to obtain high-quality audio signals and/or video signals with a high resolution on the basis of the digitalized audio and/or video signals.

To achieve the above-mentioned object, the present invention provides a signal processing method for transforming N-bit digital signals into M-bit digital signals, where M is larger than N, the N-bit digital signals being obtained by converting an analog signal into digital signals, the method comprising the steps of: detecting transition points on a time axis and intervals between the transition points at which successive digital signals of the N-bit digital signals vary in value; generating (M-N) bit additional signals which correct errors of the N-bit digital signals within a range of ±0.5 least significant bit of the N-bit digital signals in response to the transition points and the intervals; delaying the (M-N) bit additional signals so as to correspond to least significant bits of the N-bit digital signals; and combining the delayed (M-N) bit additional signals with the N-bit digital signals to generate the M-bit digital signals.

The detecting step may comprise the steps of: detecting successive first, second and third transition points; and detecting a first interval length between the first and second transition points and a second interval length between the second and third transition points, and the generating step may comprise the step of generating the additional signals so that the N-bit digital signals are linearly interpolated by the additional signals in a first signal processing period, the first signal processing period being from a midpoint of the first and second transition points and another midpoint of the second and third transition points when the first and second interval lengths are the same and transition directions in value of the digital signals at both the second and third transition points are the same or the first signal processing period being corresponding to either of the first and second intervals which is shorter than the other and the transition directions at both the second and third transition points are the same, and generating the additional signals in a second signal processing period predetermined in accordance with the second interval length when the transition directions at the second and third transition points are different from each other, the additional signals being generated in the second signal processing period in such a way that an integral value of an analog value represented by the M-bit digital signals is substantially equal to an integral value of an analog value represented by the N-bit digital signals.

Further, the present invention provides a signal processing apparatus for transforming N-bit digital signals into M-bit digital signals, where M is larger than N, the N-bit digital signals being obtained by converting an analog signal into digital signals, the apparatus comprising: means for detecting transition points on a time axis and intervals between the transition points at which successive digital signals of the N-bit digital signals vary in value; means, responsive to the transition points and the intervals, for generating (M-N) bit additional signals which correct errors of the N-bit digital signals within a range of ±0.5 least significant bit of the N-bit digital signals; means for delaying the (M-N) bit additional signals so as to correspond to least significant bits of the N-bit digital signals; and means for combining the delayed (M-N) bit additional signals with the N-bit digital signals to generate the M-bit digital signals.

The detecting means may comprise: means for detecting successive first, second and third transition points; and means for detecting a first interval length between the first and second transition points and a second interval length between the second and third transition points, and the generating means comprises means for generating the additional signals so that the N-bit digital signals are linearly interpolated by the additional signals in a first signal processing period, the first signal processing period being from a midpoint of the first and second transition points and another midpoint of the second and third transition points when the first and second interval lengths are the same and transition directions in value of the digital signals at both the second and third transition points are the same or the first signal processing period being corresponding to either of the first and second intervals which is shorter than the other and the transition directions at both the second and third transition points are the same, and generating the additional signals in a second signal processing period predetermined in accordance with the second interval length when the transition directions at the second and third transition points are different from each other, the additional signals being generated in the second signal processing period in such a way that an integral value of an analog value represented by the M-bit digital signals is substantially equal to an integral value of an analog value represented by the N-bit digital signals.

Further, the detecting means may comprise: means for delaying the N-bit digital signals by a specific sampling period carried by first clock signals to generate the successive digital signals; means for comparing values of the generated successive digital signals to generate comparison signals when the values are not equal to each other; means, responsive to the comparison signals and second clock signals 180 degree out of phase from the first clock signals, for generating transition point signals indicative of the transition points only when the values of the successive digital signals spaced by the specific sampling period are not equal to each other; and means, responsive to the first clock signals and the transition point signals, for counting a specific number of the first clock signals between successive transition points to detect the periods.

Further, the generating means may comprise: means, responsive to the comparison signals and the transition point signals, for generating transition status signals synchronized with the transition point signals, the transition status signals being indicative of value transition of the successive digital signals at the transition points; means for delaying the transition status signals by means of the transition point signals; means, based on the delayed transition point signals, for generating extreme period signals indicative of periods for the N-bit digital signals in extreme value; means for detecting differences in length of the periods; means storing first (M-N) bit additional signals corresponding to the periods of extreme value and second (M-N) bit additional signals corresponding to periods of value transition; means for reading the first (M-N) bit additional signals in response the differences in length and the extreme period signals; means for reading the second (M-N) bit additional signals in response the transition status signals; and means for selectively outputting the read first and second (M-N) bit additional signals.

Further, the present invention provides a signal processing method for transforming N-bit digital signals into M-bit digital signals, where M is larger than N, the N-bit digital signals being obtained by converting an analog signal into digital signals, the method comprising the steps of: detecting transition patterns of successive digital signals of the N-bit digital signals over transition points on a time axis, at the transition points the successive digital signals varying; generating (M-N) bit additional signals which correct errors of the N-bit digital signals within a range of ±0.5 least significant bit of the N-bit digital signals based on the transition patterns; combining the (M-N) bit additional signals with the N-bit digital signals so that the (M-N) bit additional signals correspond to least significant bits of the N-bit digital signals to generate the M-bit digital signals.

The detecting step may comprise the steps of: detecting successive first, second, third and fourth transition points at which two successive digital signals vary in value; and detecting transition patterns represented by the detected four transition points, and the generating step may comprise the step of generating interpolation signals in accordance with the detected transition patterns so that a linear interpolation is executed to modified digital signals within a range of ±0.5 least significant bits between the second and third transition points in correspondence to another linear interpolation already executed between the first and second transition points, the modified digital signals being obtained by limiting an N-bit digital signal value at a transition point between the second and third transition points down to one least significant bit, thus generating (M-N) bit additional signals based on the generated interpolation signals.

Further, the present invention provides a signal processing apparatus for transforming N-bit digital signals into M-bit digital signals, where M is larger than N, the N-bit digital signals being obtained by converting an analog signal into digital signals, the apparatus comprising: means for detecting transition patterns of successive digital signals of the N-bit digital signals over transition points on a time axis, at the transition points the successive digital signals varying; means for generating (M-N) bit additional signals which correct errors of the N-bit digital signals within a range of ±0.5 least significant bit of the N-bit digital signals based on the transition patterns; and means for combining the (M-N) bit additional signals with the N-bit digital signals so that the (M-N) bit additional signals correspond to least significant bits of the N-bit digital signals to generate the M-bit digital signals.

The detecting means may comprise: means for detecting successive first, second, third and fourth transition points at which two continuous digital signals vary in value; and means for detecting transition patterns represented by the detected four transition points, and the generating means comprises means for generating interpolation signals in accordance with the detected transition patterns so that a linear interpolation is executed to modified digital signals within a range of ±0.5 least significant bits between the second and third transition points in correspondence to another linear interpolation already executed between the first and second transition points, the modified digital signals being obtained by limiting an N-bit digital signal value at a transition point between the second and third transition points down to one least significant bit, thus generating (M-N) bit additional signals based on the generated interpolation signals.

Further, the detecting means may comprise: means for delaying the N-bit digital signals by a specific sampling period carried by first clock signals to generate the successive digital signals; means for comparing values of the generated successive digital signals to generate comparison signals and transition status signals indicative of increase or decrease in value at the transition points when the values are not equal to each other; means, responsive to the comparison signals and second clock signals 180 degree out of phase from the first clock signals, for generating transition point signals indicative of the transition points only when the values of the successive digital signals spaced by the specific sampling period are not equal to each other; means for counting the first clock signals to generate count signals; means for synchronizing the transition status signals and the count signals with the transition point signals; and means, responsive to the synchronized transition status signals and count signals, for generating transition patterns of the successive digital signals.

Further, the generating means may comprise: means for detecting differences between the transition points on the time axis using the count signals and the transition point signals; means for conducting a specific linear interpolation to the N-bit digital signals based on the differences and the transition pattern signals; and means for taking least significant (M-N) bits from the interpolated N-bit digital signals to generate the (M-N) bit additional signals.

The conducting means may conduct the linear interpolation per four successive transition points.

Further, the conducting means may comprise: means for generating interpolation signals for transition point group each including specific number of successive transition points; means for averaging the interpolation signals; and means for applying the averaged interpolation signals to conduct the linear interpolation to the N-bit digital signals.

BRIEF DESCRIPTION OF THE DRAWINGS

FIGS. 16A to 16E are waveform diagrams for assistance in explaining the operation of the second embodiment according to the present invention;

DETAILED DESCRIPTION OF THE EMBODIMENTS

The method and apparatus according to the present invention will be described hereinbelow with reference to the attached drawings. First, the case will be explained where M-bit codes are obtained with bit-transformation of N-bit codes (where M>N) obtained by converting an analog signal into digital signals on the basis of a resolution of $\frac{1}{2^N}$.

In the signal processing method and apparatus according to the present invention, when the values of the N-bit codes increase or decrease in sequence on the time axis, the length of period (indicated by the number of sampling periods) during which N-bit code values continue at a constant level is compared with the length of adjacent period during which N-bit code values continue also at a constant level.

Further, when a difference in N-bit code value between the two adjacent periods is one LSB and further when the lengths of the two periods are different from each other, (M-N)-bit additional signals are generated in such a way that an N-bit value at a midpoint of the shorter period of the two adjacent periods can be connected to an N-bit value at another point of the longer period of the two periods, where the distance from the border between the two periods to the midpoint equals to the distance from the border to the other point. The additional signal generated as described above is added to the N-bit codes so that the M-bit codes can be generated. Further, in the case of the period at which an M-bit codes correspond to extreme (maximum or minimum) value, (M-N)-bit additional signals previously determined on the basis of that period length are added to the N-bit codes so that the M-bit codes can be generated. On the other hand, when a difference in N-bit code value between the two adjacent periods is larger than one LSB, (M-N)-bit additional signals are generated as described above on the assumption that the difference in code value is one LSB, and the generated additional signals are added to the N-bit codes.

Figure 1:
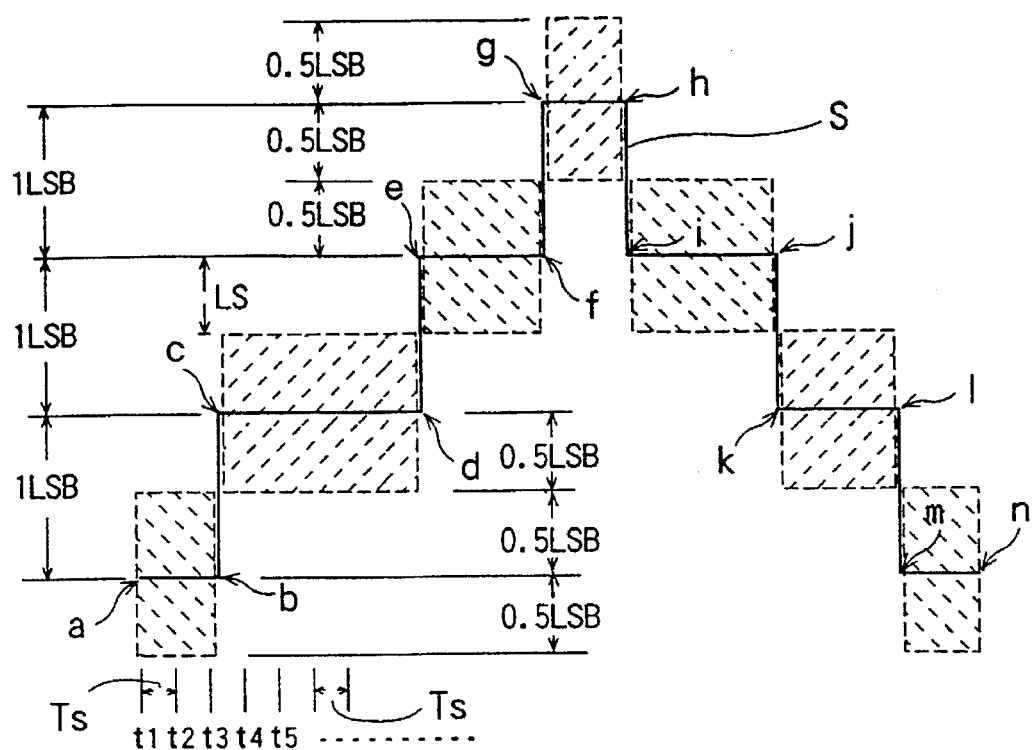
FIG. 1 is a diagram for assistance in explaining the error of digital signals obtained by D/A conversion of an analog signal.
Figure 2A:
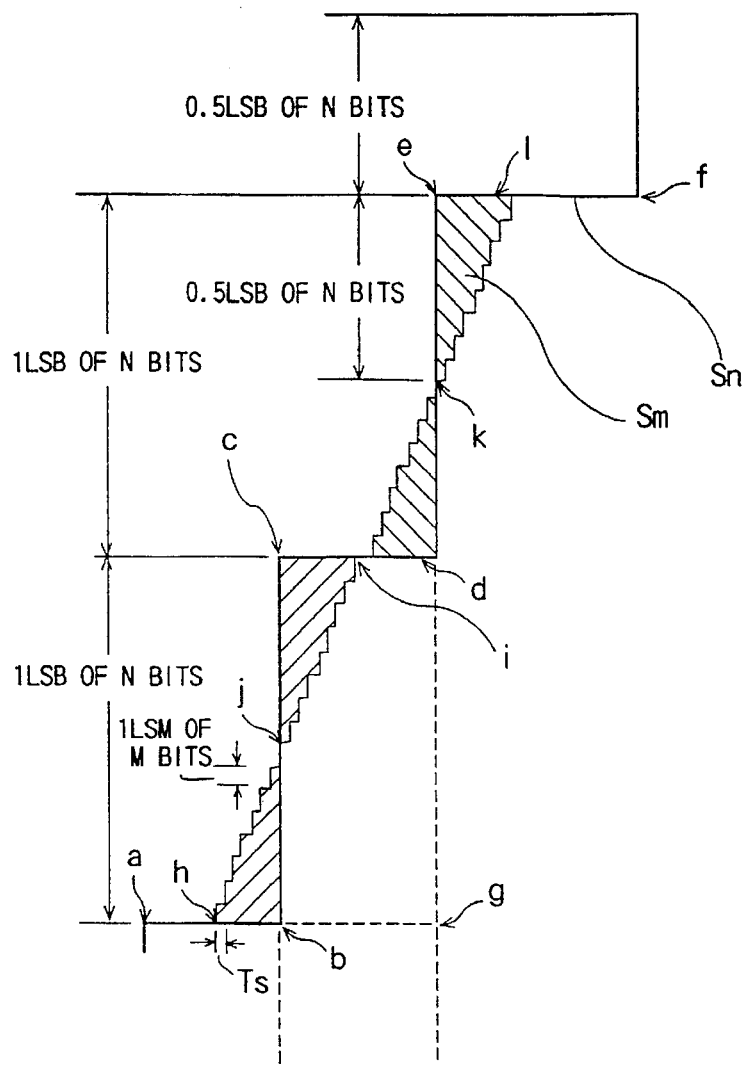
FIGS. 2A and 2B are waveform diagrams for assistance in explaining the operation of the first embodiment according to the present invention, respectively.
Figure 2B:
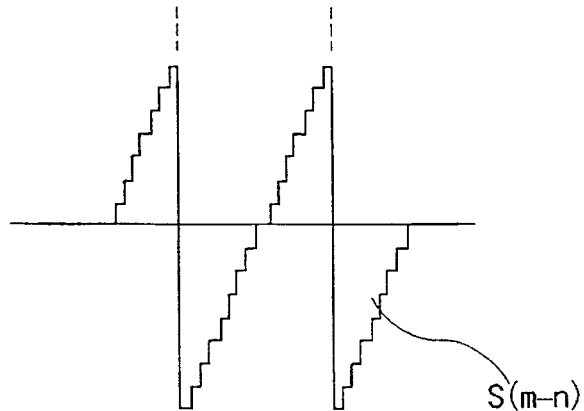
Figure 3A:
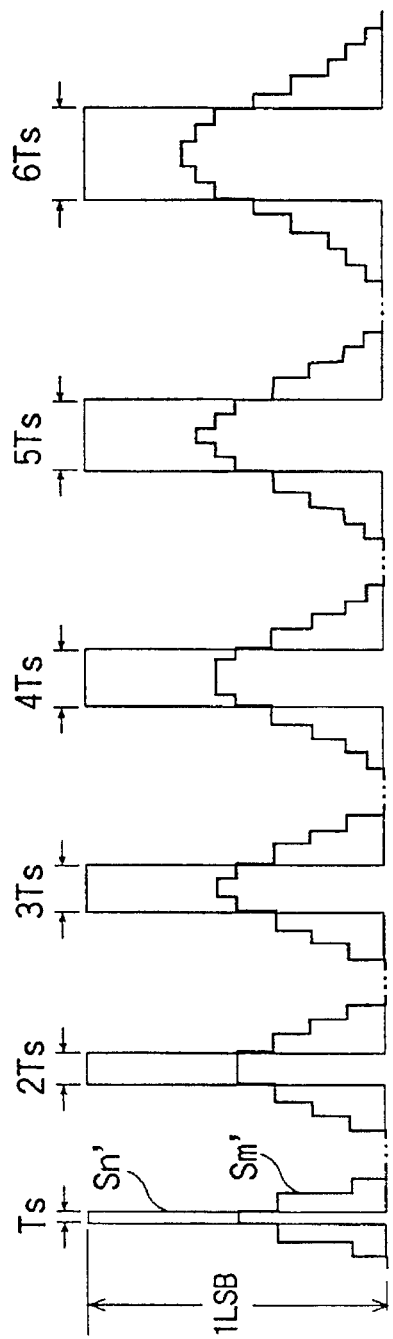
FIGS. 3A to 6B are a series of waveform diagrams for assistance in explaining the operation of the first embodiment according to the present invention.
Figure 3B:
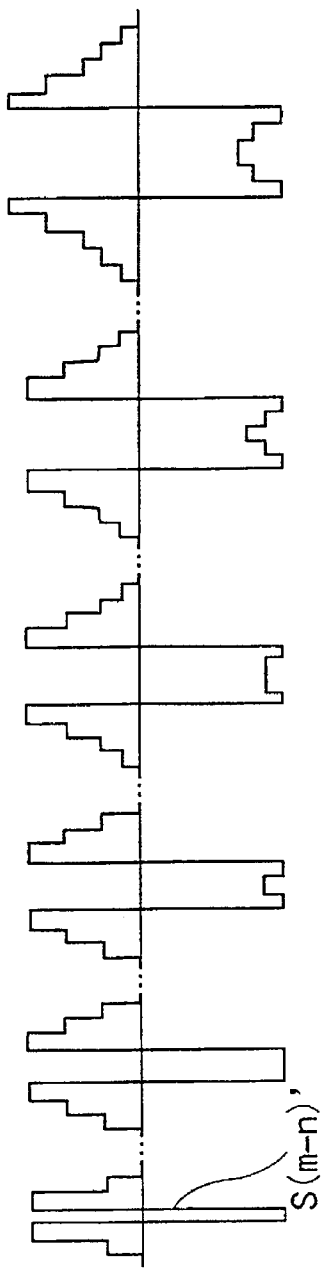
Figure 4A:
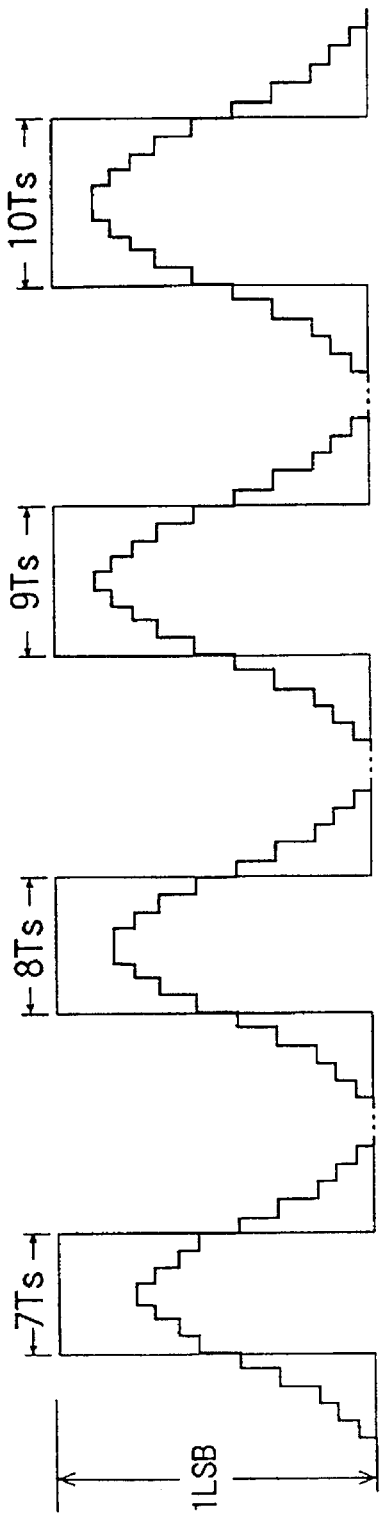
Figure 4B:
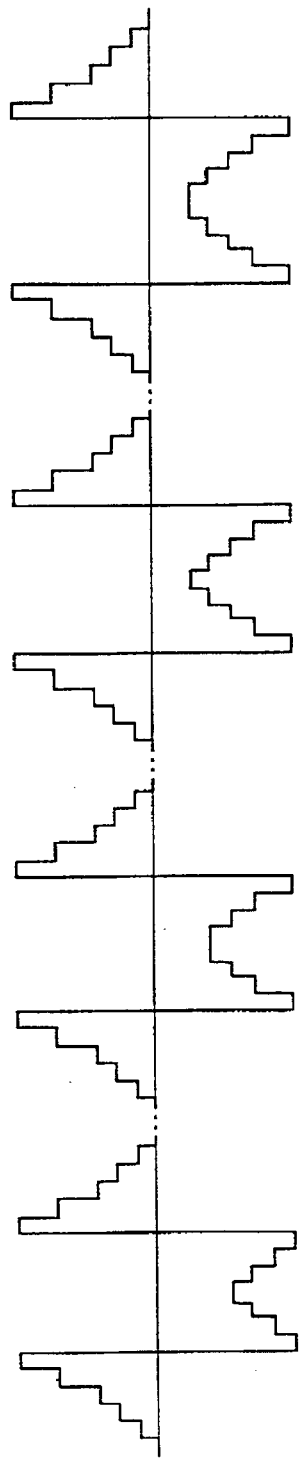
Figure 5A:
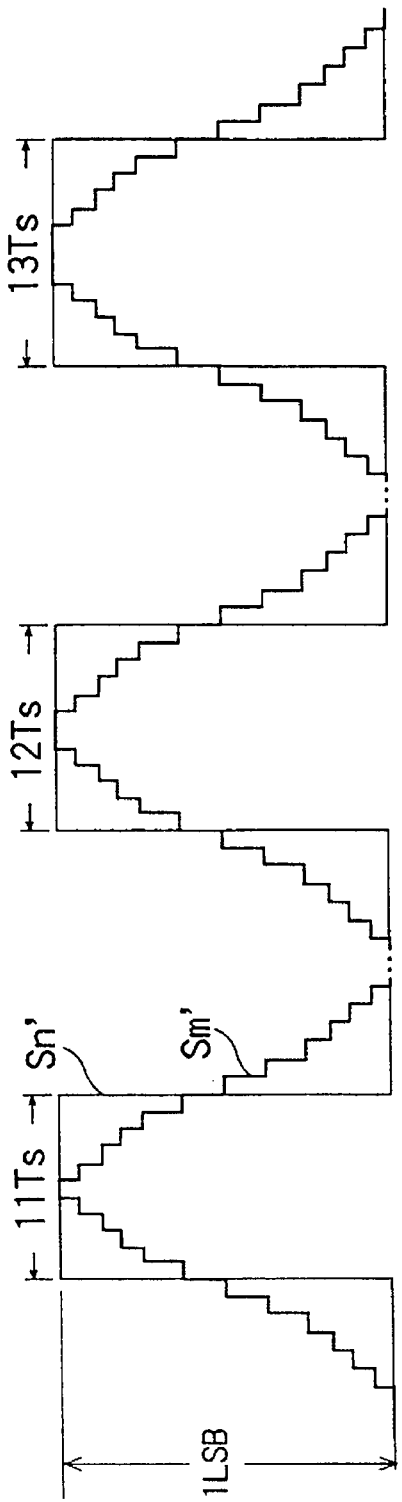
Figure 5B:
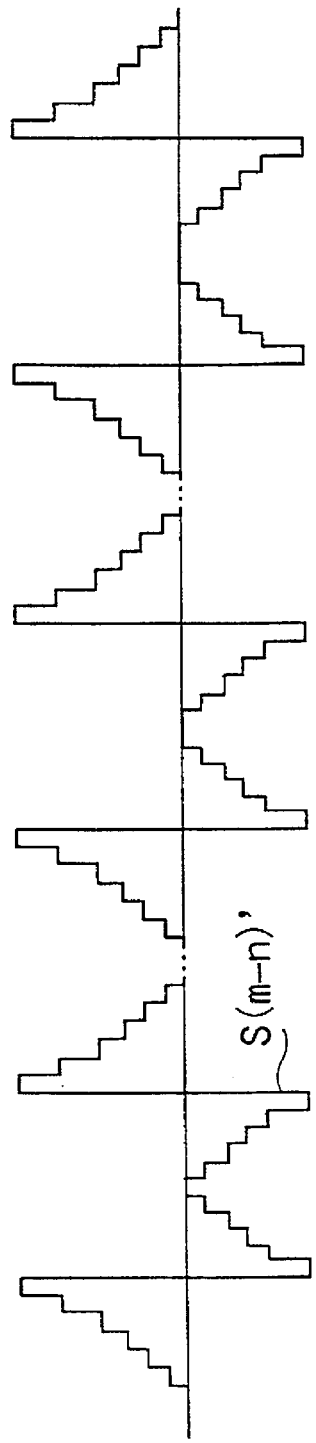
Figure 6A:
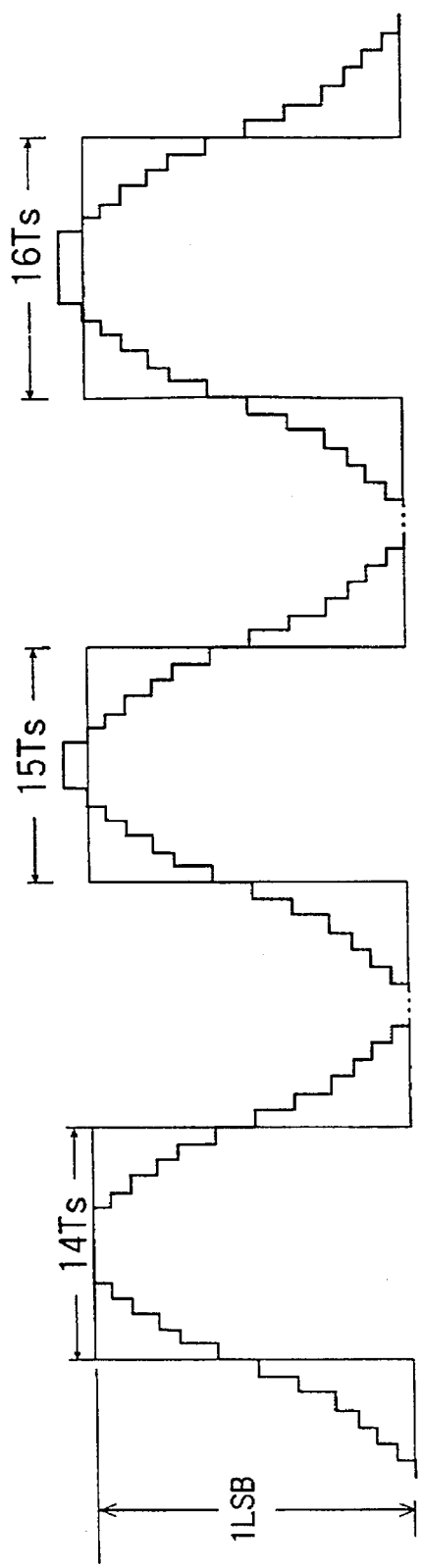
Figure 6B:
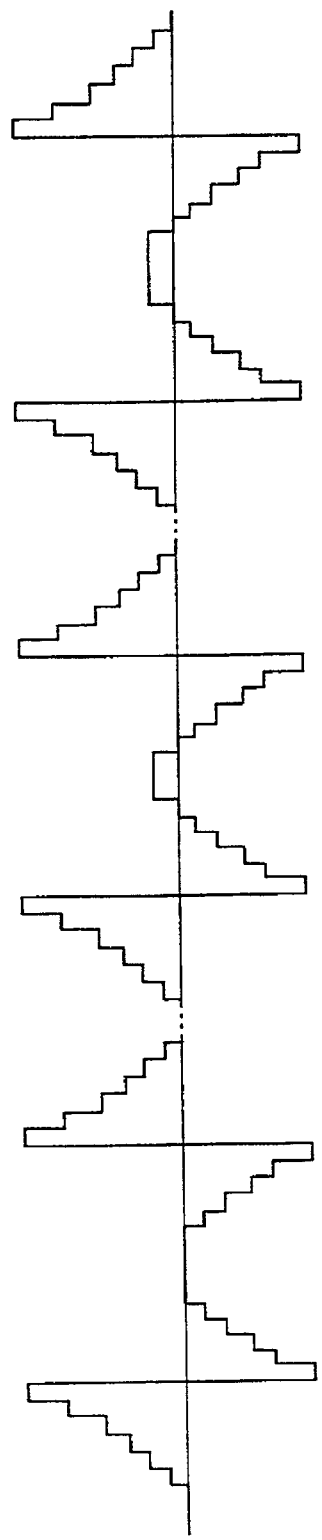

FIGS. 2A and 2B show M-bit codes generated by adding the (M-N)-bit additional signals to the least significant bit of the N-bit codes, by way of example. In FIG. 2A, the lines Sn represent the codes whose number of bits are not yet transformed and the lines Sm show generated M-bit codes. In FIG. 2B, the lines S(m-n) represent the (M-N)-bit additional signals.

In the signal processing method and apparatus according to the present invention, when the N-bit codes increase or decrease in sequence on the time axis, the period length during which the N-bit codes of the same value continue (e.g., the period length between a and b in FIG. 2A) is compared with the adjacent period (e.g., the period length between c and d in FIG. 2A). When the two adjacent periods are the same in length, an additional signal is generated in such a way that two midpoints of the two adjacent periods can be connected to each other by a line. In other words, when the period length between a and b is the same as that between c and d, the additional signal is generated in such a way that the midpoint h of the period between a and b can be connected to the midpoint i of the period between c and d by a line.

On the other hand, when the periods of the two adjacent period lengths are different from each other, the additional signal is generated in such a way that an N-bit value at a midpoint of the shorter period of the two adjacent periods can be connected to an N-bit value at another point of the longer period of the two periods, where the distance from the border between the two periods to the midpoint equals to the distance from the boarder to the other point. That is, in FIG. 2A, since the period between e and f is longer than the period between c and d, an additional signal is generated in such a way that the midpoint i at the period of the shorter length between c and d is connected to the point 1 of the longer period length between e and f. The length between i and the border d equals the length between the border e and 1

Further, in the case of the period at which the M-bit codes indicate an extreme value, (M-N)-bit additional signals previously determined on the basis of that period length are added to the N-bit codes, to generate M-bit codes.

FIGS. 3A to 6B show a series of the N-bit codes Sn', the generated M-bit codes Sm' and the additional signals S(m-n)' in a form of analog signal in such a way that the period lengths having the maximum values correspond to one sampling period (1Ts) to 16 sampling periods (16Ts). As shown in FIGS. 3B, 4B, 5B and 6B, the additional signal S(m-n)' is generated in such a way that the rectangular area of the maximum portion becomes roughly equal to the region of the M-bit code Sm' corresponding to the maximum value. Further, since the N-bit code includes an error of ±0.5 LSB, as already explained, it is also possible to generate the additional signal S(m-n)' in such a way that the rectangular area of the extreme portion whose height changes within a range of ±0.5 LSB becomes roughly equal to the area of the region of the M-bit code (Sm) corresponding to the maximum value.

Figure 7:
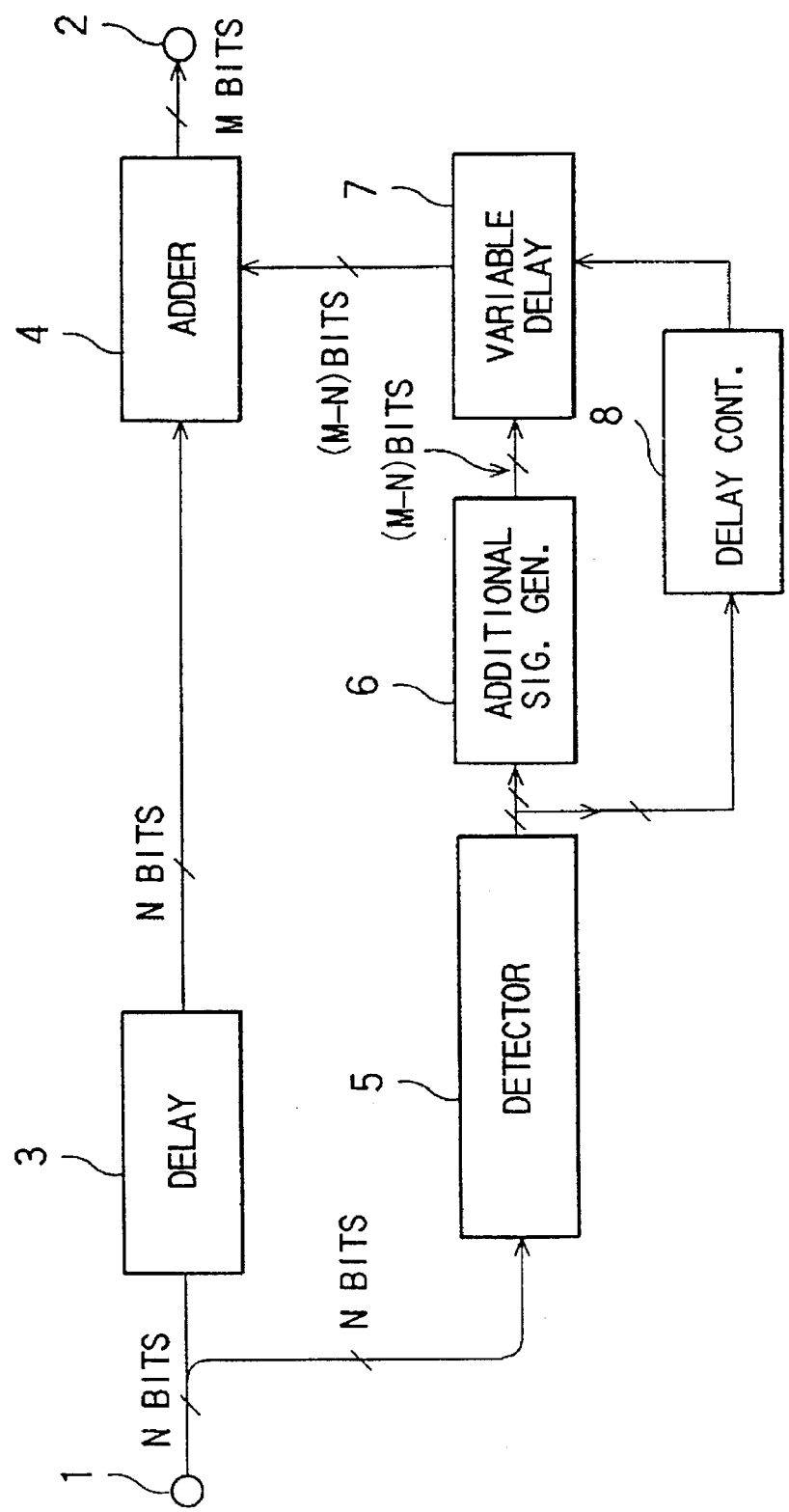
FIG. 7 is a block diagram showing a construction of the first embodiment according to the present invention.

FIG. 7 shows an example of the signal processing apparatus by which the signal processing method according to the preset invention can be realized. In FIG. 7, the signal processing apparatus includes a delay circuit 3 having a fixedly set delay time, an adder 4, a detector 5 for detecting the change modes of the signal waveforms, an additional signal generator 6 for generating an (M-N)-bit additional signal (where M>N), a variable delay circuit 7 and a delay control signal generator 8.

In FIG. 7, N-bit digital signals to be processed are supplied to the delay circuit 3 and the detector 5 through an input terminal 1. After having been delayed by a predetermined constant time by the delay circuit 3, the N-bit digital signals are supplied to the adder 4. The detector 5 detects data related to the waveform change modes and the waveform change periods of the N-bit digital signals supplied through the input terminal 1. The detected data is supplied to the additional signal generator 6 and then to the variable delay circuit 7.

According to the change modes and the change periods of the signal waveforms of the N-bit digital signals, the additional signal generator 6 generates the (M-N)-bit additional signals, and the generated additional signals are then supplied to the variable delay circuit 7. In other words, the additional signal generator 6 generates the additional signals described later, according to whether the signal waveforms increase or decrease in sequence or whether the period length during which the signal waveform continues at a constant level is the same in the two adjacent periods or whether the change of the signal waveform indicates the extreme point.

The variable delay circuit 7 generates a time delay required to add the generated additional signal to the least significant bit of the corresponding N-bit codes. The rate of the generated time delay is controlled by a delay control signal outputted by the delay control signal generator 8. In more detail, the delay control signal generator 8 generates a delay control signal on the basis of the signal waveform change data, the signal waveform change mode data, and the signal waveform change period data all supplied by the detector 5, and supplies the generated delay control signal to the variable delay circuit 7.

The adder 4 adds the N-bit digital signals to be processed delayed by the delay circuit 3 to the (M-N)-bit additional signals delayed by the variable delay circuit 7, and transmits the resultant M-bit digital signals through an output terminal 2.

Figure 8:
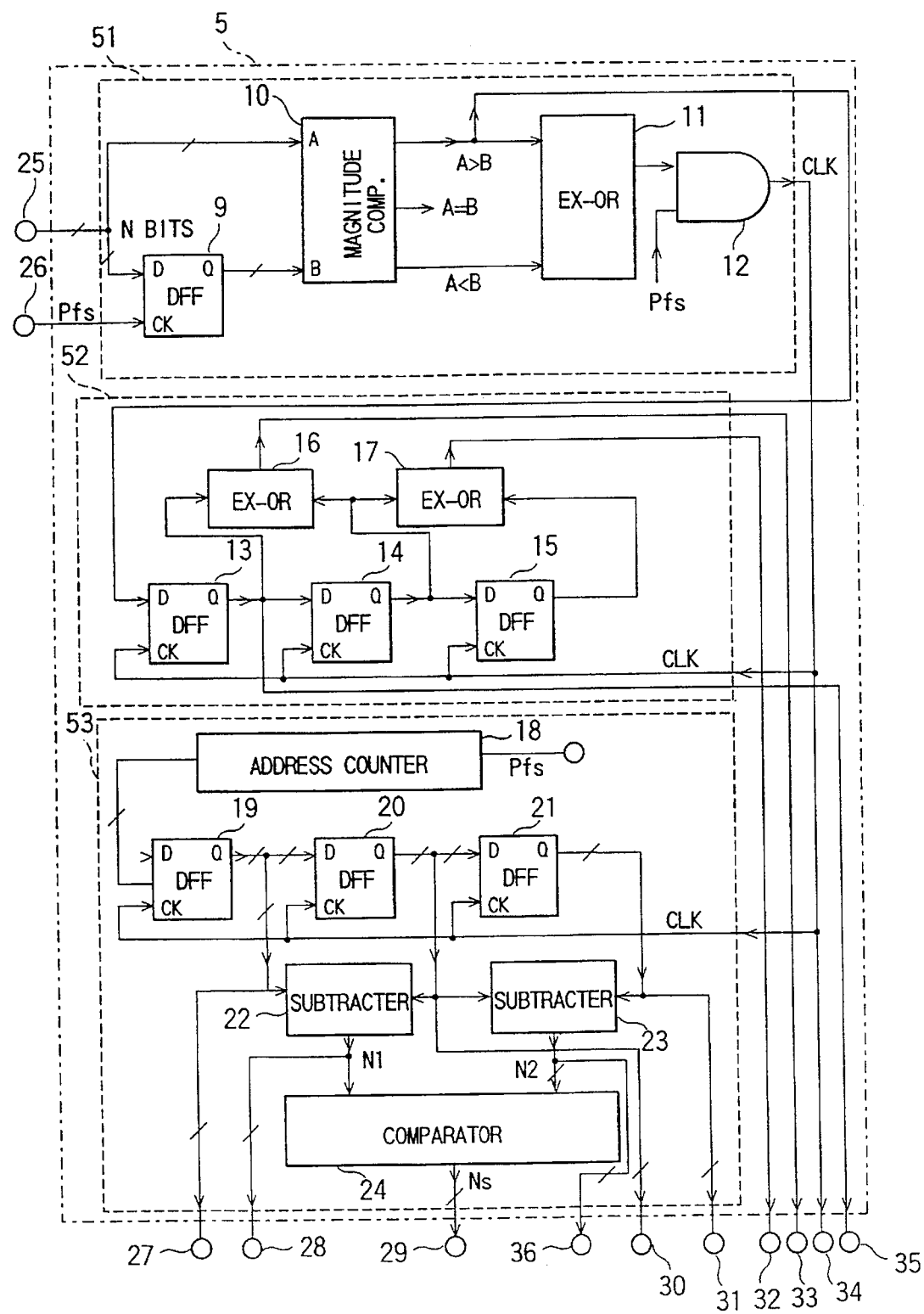
FIG. 8 is a block diagram showing a more practical construction of a part of the apparatus shown in FIG. 7.
Figure 9:
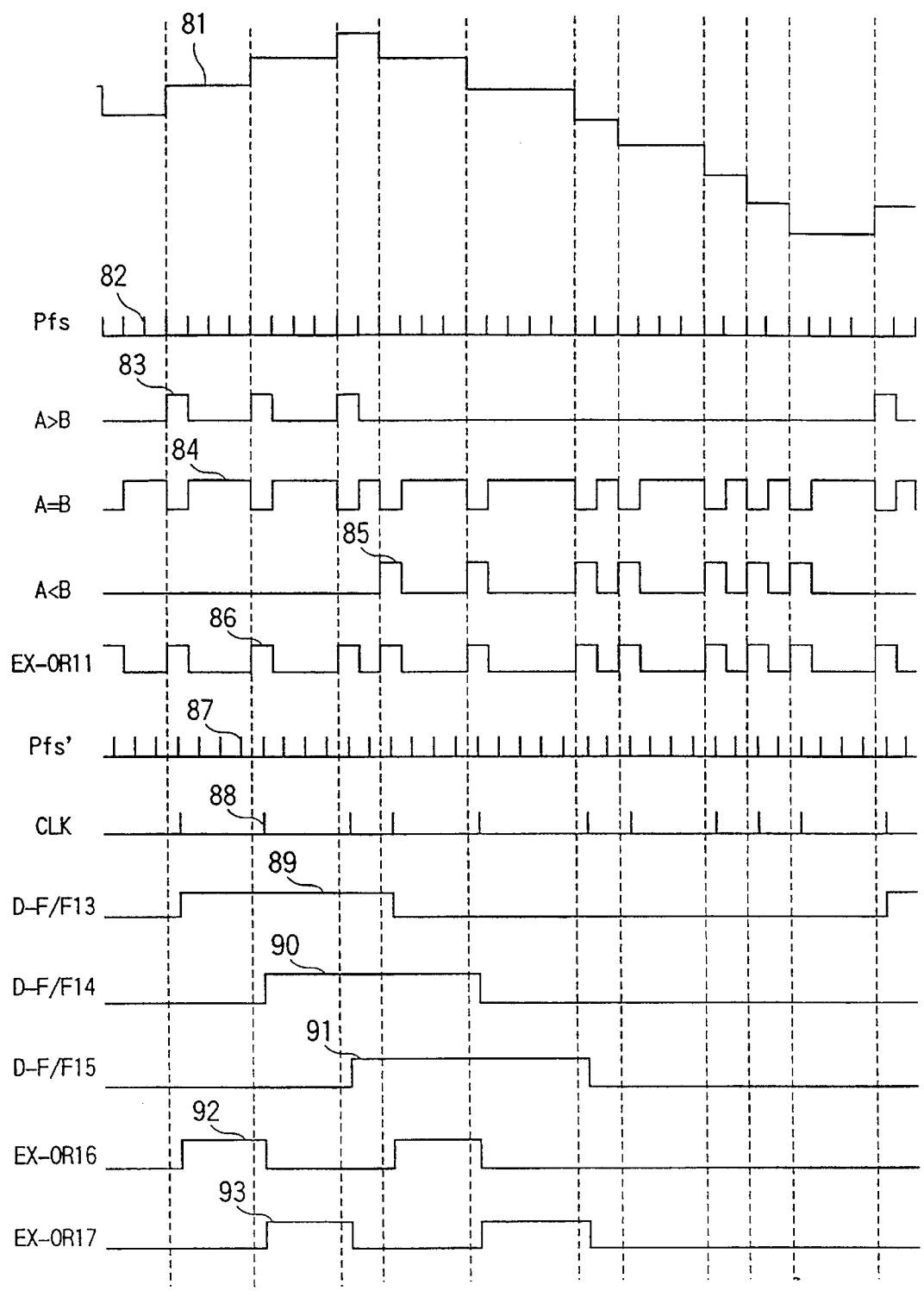
FIGS. 9 is a waveform diagram showing the respective portions of the apparatus shown in FIG. 7.

With reference to FIGS. 8 and 9, the practical construction and operation of the detector 5 will be explained in more detail hereinbelow. In FIG. 8, the detector 5 is composed of a transition point detector 51 for detecting transition points of the signal waveforms, a transition state detector 52 for generating a signal indicative of the transition state of the signal waveform, and an interval detector 53 for detecting the intervals between the transition points of the signal waveform. The N-bit digital signals to be processed are supplied to an input terminal 25 of the detector 5, and a clock pulse Pfs is supplied to another input terminal 26. As the clock pulse Pfs, a pulse having a frequency the same as the sampling frequency fs (used when the digital signals to be processed are generated) is used. In the case where the digital signals to be processed are audio signals, a pulse having a frequency of 44.1 KHz, for instance is used as the clock pulse Pfs.

The N-bit digital signals 81 (as shown in FIG. 9) supplied through the input terminal 25 are given to an A-input terminal of a magnitude comparator 10 and a data terminal of a D-type flip-flop (DFF) 9. On the other hand, the clock pulse Pfs (as shown by 82 in FIG. 9) is given to a clock terminal of the DFF 9. Further, the output signal of a Q terminal of the DFF 9 is supplied to a B-input terminal of the magnitude comparator 10.

On the basis of the clock pulse Pfs supplied to the clock terminal of the DFF 9, the DFF 9 delays the N-bit digital signals supplied to the data terminal by one sampling period, and supplies the delayed digital signals to the B-input terminal of the magnitude comparator 10.

The magnitude comparator 10 compares the digital signal A supplied to the A-input terminal thereof with the digital signal B supplied to the B-input terminal thereof. When the value of the digital signal A is larger than that of the digital signal B, the magnitude comparator 10 sets an output terminal A>B to a high level (as shown by 83 in FIG. 9). At this time, another output terminal A<B is set to a low level (as shown by 85 in FIG. 9). Further, when the value of the digital signal A is equal to that of the digital signal B, the magnitude comparator 10 sets an output terminal A=B to a high level (as shown by 84 in FIG. 9) and the other output terminals A>B and A<B to the low level. Further, when the value of the digital signal B is larger than that of the digital signal A, the magnitude comparator 10 sets only the output terminal A<B to the high level (as shown by 85 in FIG. 9), and sets the other output terminals A>B and A=B to the low level.

The output signals 83 and 85 of the output terminals A>B and A<B of the magnitude comparator 10 are both supplied to an exclusive-OR circuit 11. Further, the output signal 83 of the output terminal A>B is supplied also to a data terminal of a DFF13 of the change state detector 52.

The output of the exclusive-OR circuit 11 changes to the high level (as shown by 86 in FIG. 9) when either one of the output signals 83 and 85 of the output terminal A>B and A<B of the magnitude comparator 85 changes to the high level.

Further, since the output signals 83 and 85 of the output terminals A>B and A<B of the magnitude comparator 10 are not set to the high level at the same time, it is possible to use an OR circuit, instead of the exclusive-or circuit 11.

The output signal 86 (shown in FIG. 9) of the exclusive-OR circuit 11 is supplied to one input terminal of an AND circuit 12. Further, the pulse Pfs' (as shown by 87 in FIG. 9) is supplied to the other input terminal of the AND circuit 12. Here, the pulse Pfs' is a pulse having the same frequency as the clock pulse Pfs but 180-degree out of phase from the clock pulse Pfs.

In the construction as described above, the AND circuit 12 outputs a clock pulse CLK (as shown by 88 in FIG. 9) at the timing of the pulse Pfs', only when the data values of the two adjacent N-bit digital signals spaced by one sampling period are not equal to each other. The clock pulse CLK outputted by the AND circuit 12 is supplied to a clock terminal of the DFF 13 and also to clock terminals of DFFs 14, 15, 19, 20 and 21 and further to an output terminal 34, respectively, as shown in FIG. 8.

As understood above, one of the output terminals A>B and A<B of the magnitude comparator 10 changes to the high level, only when the N-bit digital signal levels supplied through the input terminal 25 have a tendency of increase or decrease on the time axis. Therefore, the clock pulse CLK is outputted by the AND circuit 12 only when the N-bit digital signal levels to be processed have a tendency of increase or decrease on the time axis.

Successively, the practical construction and the operation of the transition state detector 52 will be explained hereinbelow with reference to FIGS. 8 and 9. The clock pulse CLK transmitted by the AND circuit 12 of the transition point detector 51 is supplied to clock terminals of the DFFs 13 to 15 of the transition state detector 52. Further, the output signal of the output terminal A>B of the magnitude comparator 10 is supplied to a data terminal of the DFF 13. Further, the output 89 (shown in FIG. 9) of the DFF 13 is supplied to an output terminal 35, a data terminal of the DFF 14 and an exclusive-OR circuit 16, respectively. The Q output 90 (shown in FIG. 9) of the DFF 14 is supplied to a data terminal of the DFF 15, the exclusive-OR circuit 16 and also another exclusive-OR circuit 17. Further, the output 91 (shown in FIG. 9) of the DFF 15 is supplied to the exclusive-OR circuit 17.

In response to the clock pulse CLK, the DFFs 13 to 15 read the levels of their data terminals. Further, since the output signal of the output terminal A>B of the magnitude comparator 10 of the transition point detector 51 is supplied to the data terminal of the DFF 13, the DFF 13 reads the output signal level (the high or low level) of the output terminal A>B of the magnitude comparator 10, whenever the clock pulse CLK is supplied.

Here, the fact that clock pulse CLK is being generated indicates that the digital signals have a tendency to increase or decrease on the time axis. In other words, if the digital signal increases on the time axis when the clock pulse CLK is being generated, the output signal of the output terminal A>B of the magnitude comparator 10 is at the high level. In contrast with this, if the digital signal decreases on the time axis when the clock pulse CLK is being generated, the output signal of the output terminal A>B of the magnitude comparator 10 is at the low level.

Whenever the clock pulse CLK is supplied to the clock terminal of the DFF 13, the signals supplied to the data terminal of the DFF 13, that is, the output signal of the output terminal A>B of the magnitude comparator 10 is shifted to the data terminals of the DFFs 14 and 15 in sequence. The outputs 89 and 90 (both shown in FIG. 9) of the DFFs 13 and 14 are supplied to the exclusive-or circuit 16, and further the outputs 90 and 91 (both shown in FIG. 9) of the DFFs 14 and 15 are supplied to the exclusive-or circuit 17.

As shown by 92 in FIG. 9, when the Q output 89 of the DFF 13 and the Q output 90 of the DFF 14 are different from each other, the output signal of the exclusive-or circuit 16 changes to the high level. That is, when the Q output 89 of the DFF 13 changes from the low level to the high level and or vice versa, the output of the exclusive-or circuit 16 changes to the high level for one-clock pulse (CLK) period. In other words, the data indicative of the extreme value of the digital signal 81 can be obtained as the high-level output signal of the exclusive-or circuit 16 being delayed by a time corresponding to one clock. Further, since the Q output 90 of the DFF 14 and the Q output 91 of the DFF 15 are both inputted to the input terminal of the exclusive-or circuit 17, the output of the exclusive-or circuit 17 is a signal delayed by one clock CLK from the output of the exclusive-or circuit 16. The output signals of the exclusive-or circuits 16 and 17 are transmitted to two output terminals 33 and 32, and used as the position data indicative of the extreme value of the signal waveform in the additional signal generator 6 and the delay control signal generator 8, as described in further detail later.

Successively, the construction and the operation of the period detector 53 will be explained hereinbelow. The clock pulse Pfs having a sampling frequency supplied to the terminal 26 is also supplied to an address counter 18, as shown in FIG. 8. The address counter 18 counts the clock pulse Pfs, and gives the counted value to a data terminal of a DFF 19 as an address signal.

The clock pulses CLK outputted by the AND circuit 12 are also supplied to the DFF 19 and DFFs 20 and 21. Therefore, the address signal supplied to the data terminal of the DFF 19 is read by the DFF 19, whenever the clock pulse CLK is generated, and further transferred to the DFFs 20 and 21 in sequence.

The address signals outputted by the DFF 19 to 21 are transmitted to output terminals 27, 30 and 31, respectively. Further, the address signals outputted by the DFF 19 and 20 are supplied to a subtracter 22. Further, the address signals outputted by the DFF 20 and 21 are supplied to another subtracter 23.

Two output values N1 and N2 of the subtracters 22 and 23 indicate a difference between the address values of the two adjacent clock pulses CLK on the time axis. However, since the address counter 18 counts the clock pulses Pfs having the sampling period as already explained, the numerical values of the output values N1 and N2 from the two subtracters 22 and 23 are a numerical value indicative of a multiple of the period between two adjacent clock pulses on the time axis to the sampling period Ts (how many times the period between the two adjacent clock pulses CLK is longer than the sampling period Ts).

The two output values N1 and N2 of the subtracters 22 and 23 are transmitted to the output terminals 28 and 36, respectively, and further to a comparator 24. The comparator 24 compares the two values N1 and N2 and transmits the smaller one of the values N1 and N2 to an output terminal 29 as a value Ns. If the two values N1 and N2 are equal to each other, the comparator 24 transmits the N1 to the output terminal 29 as the value Ns.

Figure 10:
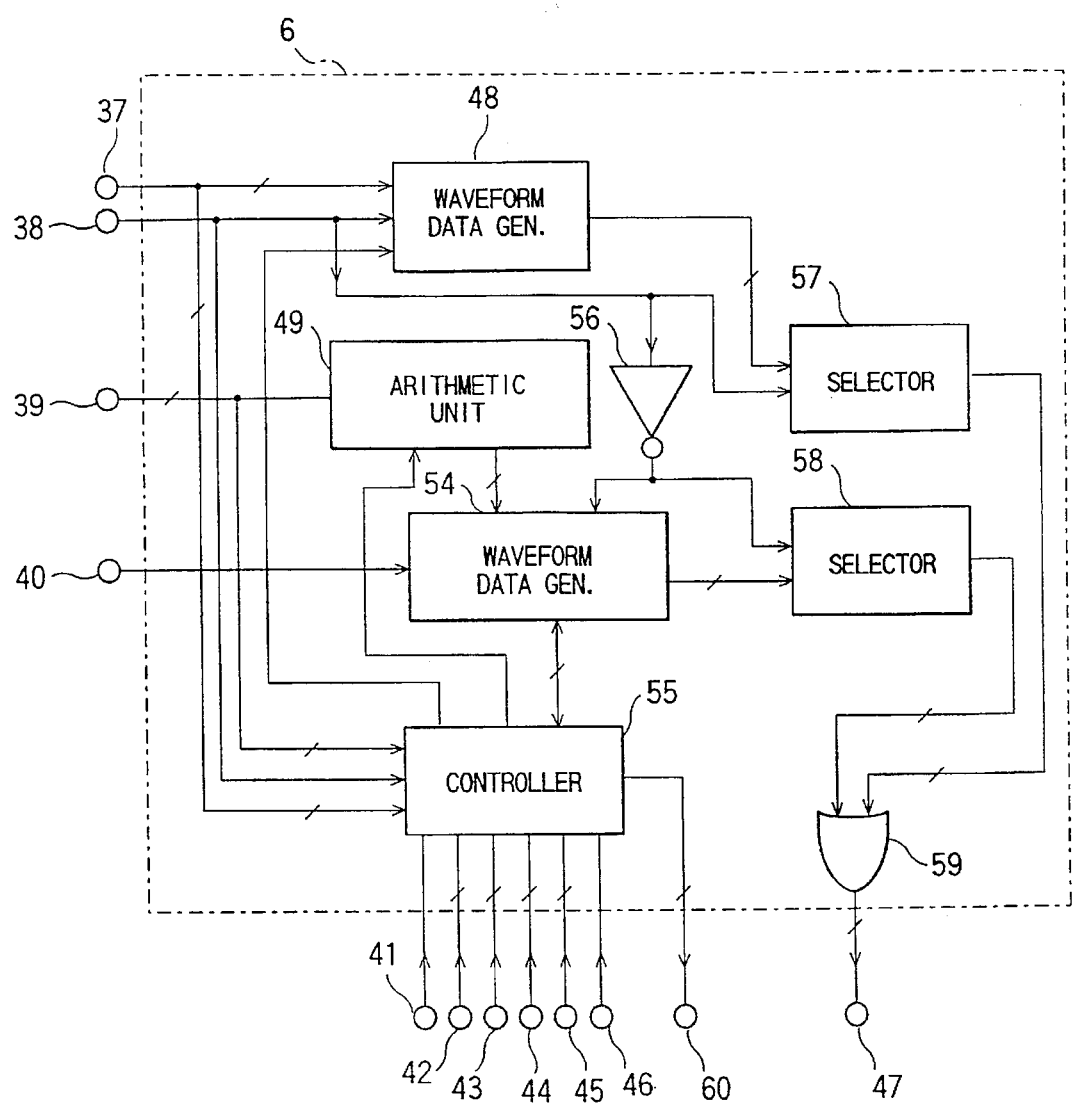
FIG. 10 is a block diagram showing a more practical construction of a part of the apparatus shown in FIG. 7.
Figure 11A:
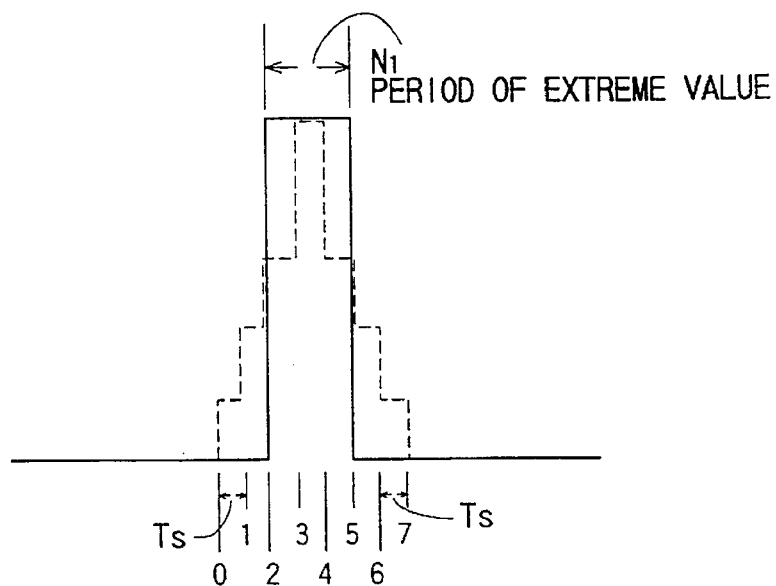
FIGS. 11A to 11C are waveform diagrams for assistance in explaining the operation of the first embodiment according to the present invention.
Figure 11B:
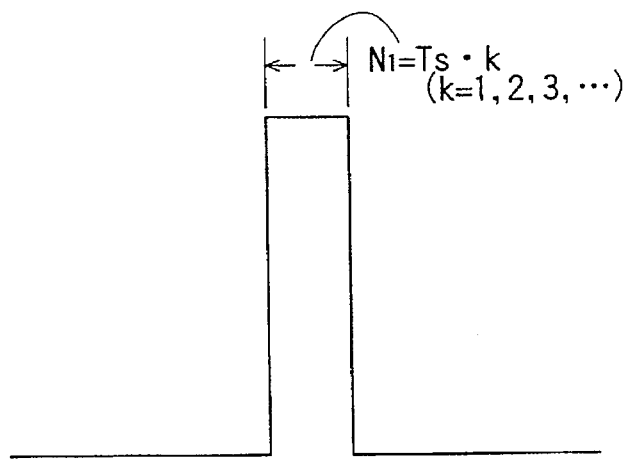
Figure 11C:
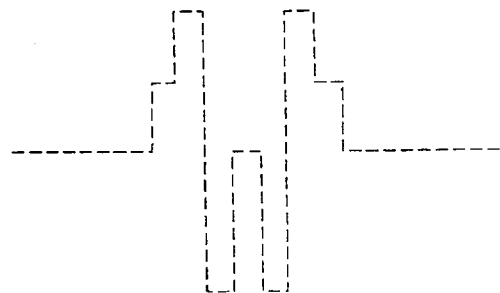

With reference to FIG. 10, the practical construction of the additional signal generator 6 will be explained hereinbelow. In FIG. 10, a waveform data generator 48 generates the waveform data at the extreme value period. This waveform data generator 48 is provided with a waveform data generating ROM (not shown) for previously storing a series of the (M-N)-bit additional signals (m-n)' as shown in FIGS. 3A to 6B.

Further, an arithmetic unit 49 divides the one LSB value of the N-bit digital signals by the numerical value Ns supplied by the comparator 24 of the interval detector 53. In other words, in order to decide the step width of the additional signal for each sampling period Ts in the shorter period length at the two adjacent periods (or either period length at the two adjacent periods if equal to each other), L/Ns is calculated, where L represents one LSB.

A waveform data generator 54 generates the waveform data of the additional signals other than those at the extreme value periods. A control circuit 55 is composed of a microprocessor, a random access memory (RAM), a read only memory (ROM), etc.

To the waveform data generator 48, the numerical value N1 (the output value N1 of the subtracter 22 of FIG. 8) is supplied from the output terminal 28 of the detector 5 of FIG. 8 through an input terminal 37, and further the signal indicative of the extreme value period is supplied from the output terminal 33 of the detector 5 to an input terminal 38. The ROM for generating waveform data (provided in the waveform data generator 48) stores the waveform data for the additional signals so that the rectangular area indicative of the extreme value can be roughly equalized to the area of the bit-transformed extreme value. The numerical value N1 is supplied to the waveform data generator 48 as the address data, and the waveform data generator 48 reads the (M-N)-bit additional signal predetermined in correspondence to the period length at the extreme value period from the ROM. The read additional signal is supplied from the waveform generator 48 to a selector 57.

In other words, when the signal indicative of the extreme value period (supplied to the input terminal 38) is at [1], the numerical value N1 indicative of the period length of the extreme value period is used as the address data, in order that the predetermined (M-N)-bit additional signal (S(m-n)' as shown in FIGS. 3A to 6B and FIG. 11C corresponding to the extreme value period can be outputted from the ROM. Further, at the extreme value period, since the signal [1] indicative of the extreme value period is supplied to the selector 57 through the input terminal 38, the (M-N)-bit additional signals outputted by the waveform data generator 48 are transmitted to the output terminal 47 via the selector 57 and an OR circuit 59.

The arithmetic unit 49 calculates L/Ns using the numerical value Ns (the output value Ns of the comparator 24 of FIG. 8) supplied through an input terminal 39. On the basis of this calculation, an average value of the step sizes of the additional signals between the adjacent samples in the extreme value period can be decided. The calculated result is supplied to the waveform data generator 54.

To the waveform generator 54, the transition detection signal (the output signal 89 of the DFF 13 shown in FIG. 9) is supplied from the output terminal 35 of the detector 5 through an input terminal 40. This transition detection signal is at [1] when the N-bit codes increase in sequence on the time axis but at [0] when the N-bit codes decreases in sequence on the time axis. Therefore, the waveform generator 54 discriminates whether the N-bit codes increase or decrease in sequence on the time axis on the basis of this transition detection signal, and changes the modes of the waveform data generation.

Figure 12A:
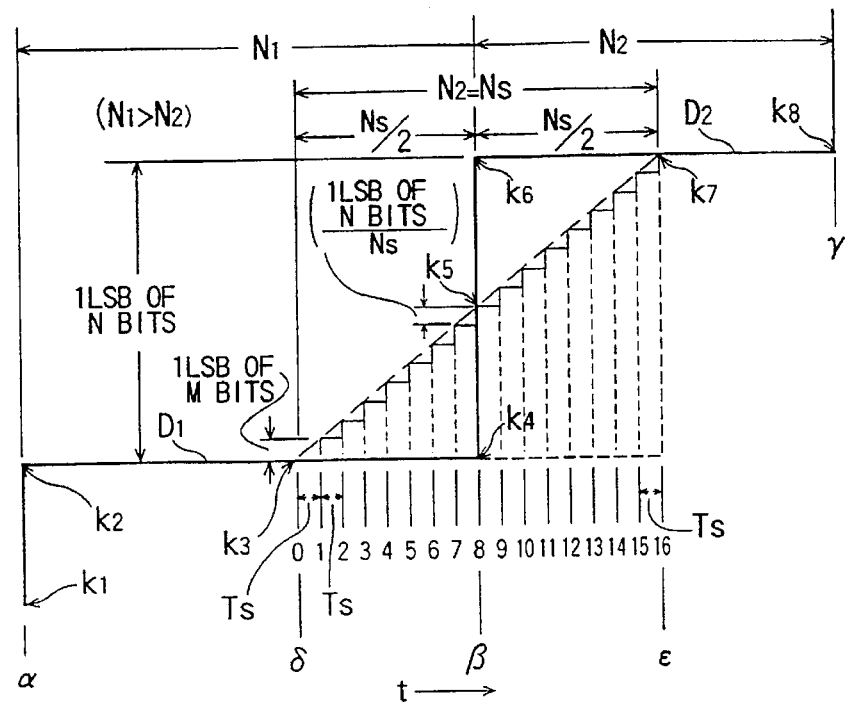
FIGS. 12A to 12C are waveform diagrams for assistance in explaining the operation of the first embodiment according to the present invention.
Figure 12B:
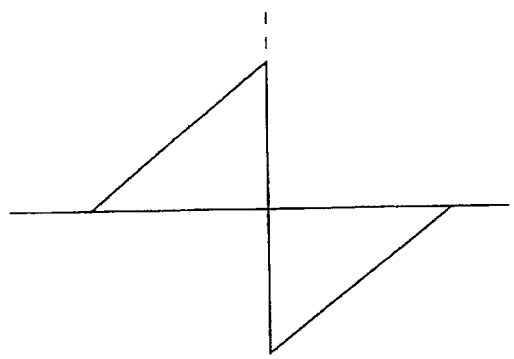
Figure 12C:
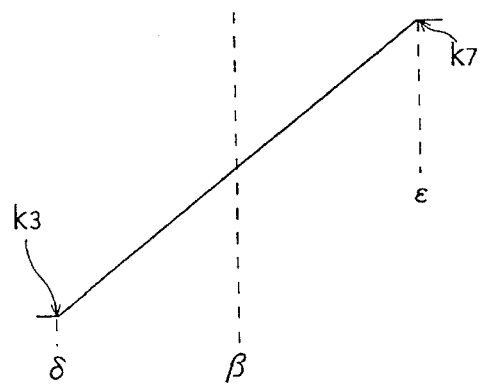

FIGS. 12A to 12C show the way to generate the waveform data other than at the extreme value periods from the waveform data generator 54, when the transition detection signal of level [1] is supplied to the waveform data generator 54, that is, when the N-bit codes have a tendency to sequentially increase on the time axis.

In FIG. 12A, the period length during which the signal level is [D1] is N1, and the adjacent period length during which the signal level is [D2] is N2. Here, the relationship between the period lengths N1 and N2 is N1>N2, for instance. In this case, the numerical value Ns supplied from the comparator 24 of the detector 5 through the output terminal 29 of FIG. 8 and the input terminal 39 of FIG. 10 is N2. In FIG. 12A, the numerical value Ns (=N2) is 16, which indicates that the number of the clock pulses Pfs generated for each sampling period Ts is Ns.

Further, in FIG. 12A, the border position β between the two periods [D1] and [D2] is designated by an address value supplied from the output terminal 30 of the detector 5 through an input terminal 44. Further, the end position γ of the period [D2] is designated by an address value supplied from the output terminal 27 of the detector 5 through an input terminal 4S. Further, the start position α of the period [D1] is designated by an address value supplied from the output terminal 31 of the detector 5 through an input terminal 45. Since being provided with the memory and the arithmetic unit, the waveform data generator 54 generates the additional signals having the values L(I) expressed by the following formulae at the respective 16 positions from 0, 1, 2, ..., 16 determined for each sampling period between the Ns/2 position at the period [D1] and the Ns/2 position at the period [D2]. Here, if L denotes the one LSB of the N bits and I denotes 0, 1, 2, ... Ns, and further when I<Ns/2, the following formula can be decided:

$$L(I)=I \times L/Ns \quad (1)$$

Further, when Is≧Ns/2, the following formula can be decided:

$$L(I)=I \times L/Ns-L \quad (2)$$

On the basis of the above-mentioned definition, the additional signal as shown in FIG. 12B can be obtained. When the additional signal is added to the digital signal to which [0] of the (M-N) bits are added to the least significant bit of the original N-bit digital signal, the signal waveform as shown in FIG. 12C can be obtained. As a result, the signal waveform of the original N-bit digital signal at the two adjacent periods [D1] and [D2] so far expressed by K2→K3→K4→K5→K6→K7→K8 can be changed to the waveform as expressed by K2→K3→K5→K7→K8.

On the other hand, when the transition detection signal [0] is supplied to the waveform data generator 54, that is, when the N-bit digital signal values decrease on the time axis in sequence, the additional signal values are as follows:

when I<Ns/2, the following formula can be decided:

$$L(I)=(Ns-I) \times L/Ns-L \quad (3)$$

Further, when I>Ns/2, the following formula can be decided:

$$L(I)=(Ns-I) \times L/Ns \quad (4)$$

In FIG. 10, the additional signals obtained as described above are stored in sequence in the memory provided in the waveform data generator 54. The (M-N)-bit additional signals read from the memory under control operation of the controller 55 are given to a selector 58. On the other hand, the signal indicative of the extreme period is supplied from the output terminal 33 of the detector 5 of FIG. 8 to the input terminal 38. When this signal is at [0], that is, when the periods are those other than the extreme value period, the output of an inverter 56 changes to [1], and this signal is then given to the selector 58. As a result, the (M-N)-bit additional signals generated by the waveform data generator 54 are transmitted to the output terminal 47 via the selector 58 and the OR circuit 59.

When one of the two adjacent same-level periods is the extreme value period, a control signal is generated by the controller 55 on the basis of the data indicative of the extreme value period and supplied to the controller 55 through the input terminal 38. In response to this control signal, the waveform data generator 54 inhibits the calculation results of the two periods including the extreme value period from being given from the waveform data generator 54 to the selector 58.

In FIG. 7, the (M-N)-bit additional signals generated by the additional signal generator 6 are supplied to the adder 4 via the variable delay circuit 7. The adder 4 adds the additional signals to the N-bit digital signals delayed by a constant time through the delay circuit 3, to output the M-bit digital signals. In practice, the adder 4 executes the addition calculation between the digital signals (obtained by adding [0] of the (M-N) bits to the least significant bit of the N-bit digital signals) and the M-bit digital signals (obtained by inserting [0] of the N-bits between the most significant bit and the second-to-most significant bit of the generated (M-N)-bit additional signals).

The variable delay circuit 7 delays the (M-N)-bit additional signals by a necessary time to match the addition timing in relation to the N-bit digital signals to be added. Further, a random access memory (RAM) can be used as the variable delay circuit 7. Further, the (M-N)-bit additional signals can be delayed by a desired predetermined time by controlling the write and read timings in and from the RAM. The predetermined delay time rate given to the additional signal can be determined on the basis of the delay control signal generated by the delay control signal generator 8.

Figure 13:
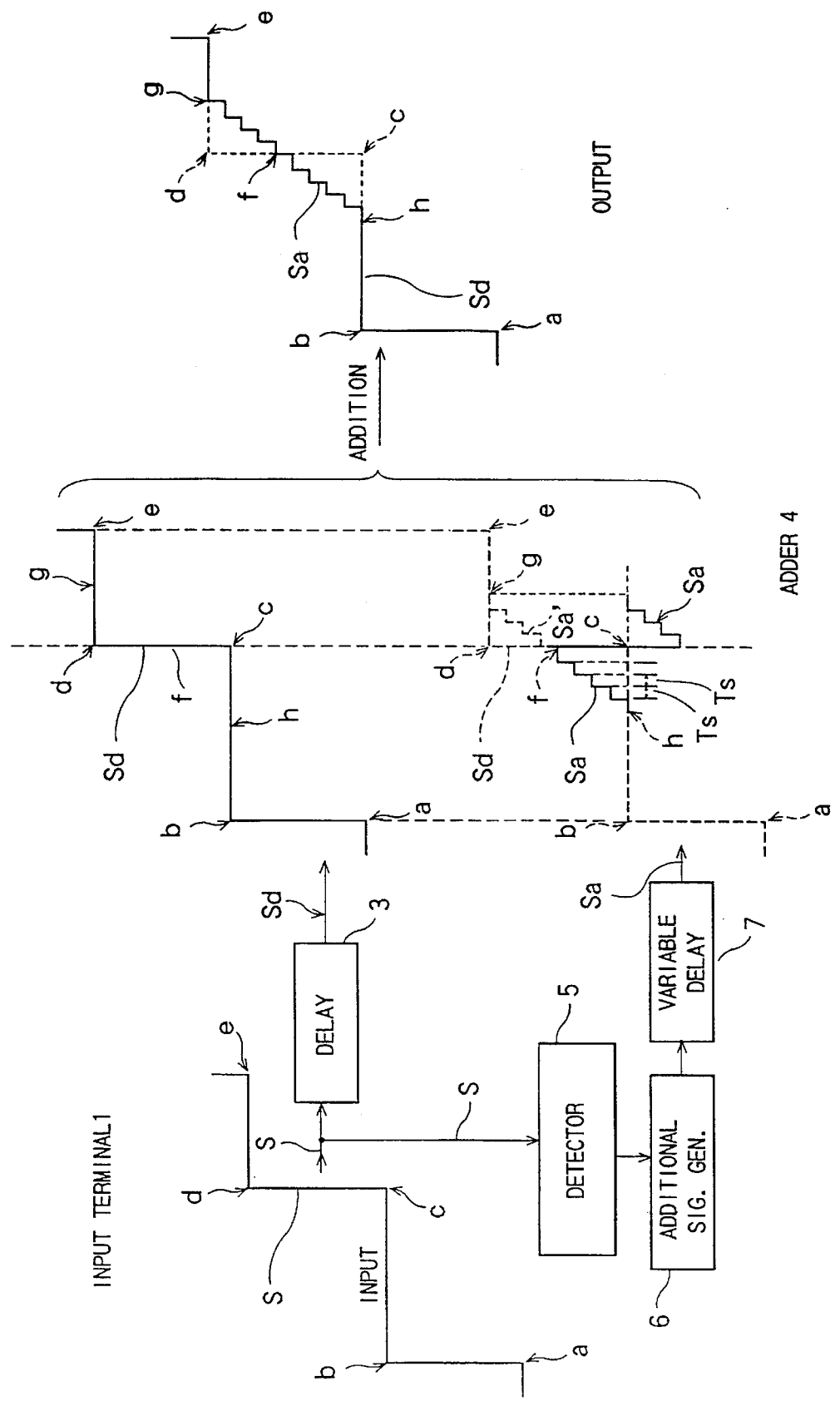
FIG. 13 is a block diagram showing a part of the apparatus and a waveform diagram for assistance in explaining the operation of the first embodiment according to the present invention in combination.

FIG. 13 shows the relationship in FIG. 7 among the N-bit digital signals S supplied to the input terminal 1, the N-bit digital signals Sd delayed by a predetermined time by the delay circuit 3, the (M-N)-bit additional signals Sa delayed by a predetermined time by the variable delay circuit 7, and the M-bit transformed digital signals in form analog. The reference symbols shown a to h in FIG. 13 are attached to clarify the time relationship between the respective waveforms. Further, the stepwise waveform Sa' represents the calculated value of I×L/Ns obtained before one LSB value (L) of the N-bits is subtracted in the formula (2).

The delay control signal generator 8 of FIG. 7 calculates the delay time to be given to the (M-N)-bit additional codes on the basis of various output signals outputted through the output terminals 27 to 36 of the detector 5 (i.e., the clock pulse CLK transmitted through the output terminal 34, the Ns value transmitted through the output terminal 29, the border position address value between the two periods transmitted through the output terminal 30, the period length data of the extreme value period transmitted from the output terminal 28, the data indicative of the extreme value period transmitted from the output terminal 33, the address value of the start position of the period and the clock pulse Pfs transmitted from the terminal 31, etc.). The generated delay control signal is given to the variable delay circuit 7.

A second embodiment of the signal processing method and apparatus according to the present invention will be described hereinbelow with reference to FIGS. 14 to 26.

Figure 14:
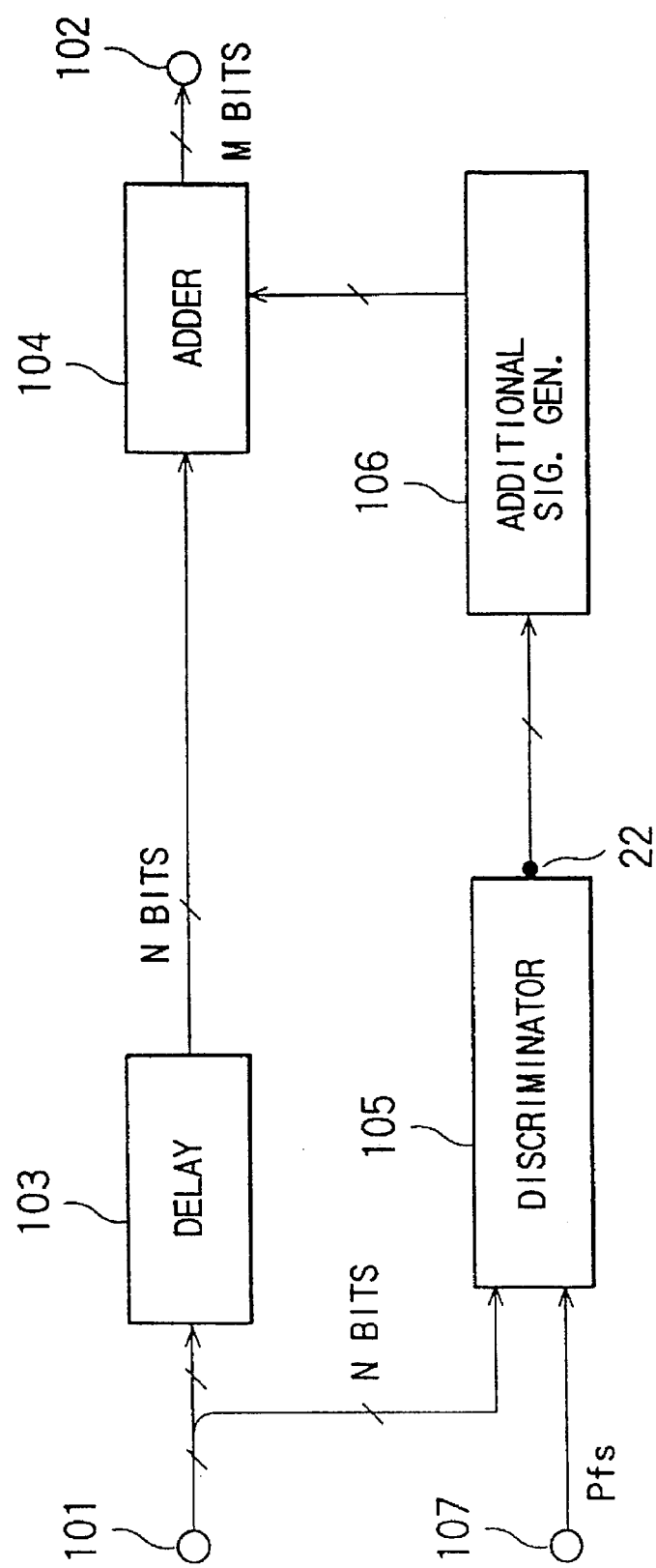
FIG. 14 is a block diagram showing a construction of the second embodiment according to the present invention.
Figure 15:
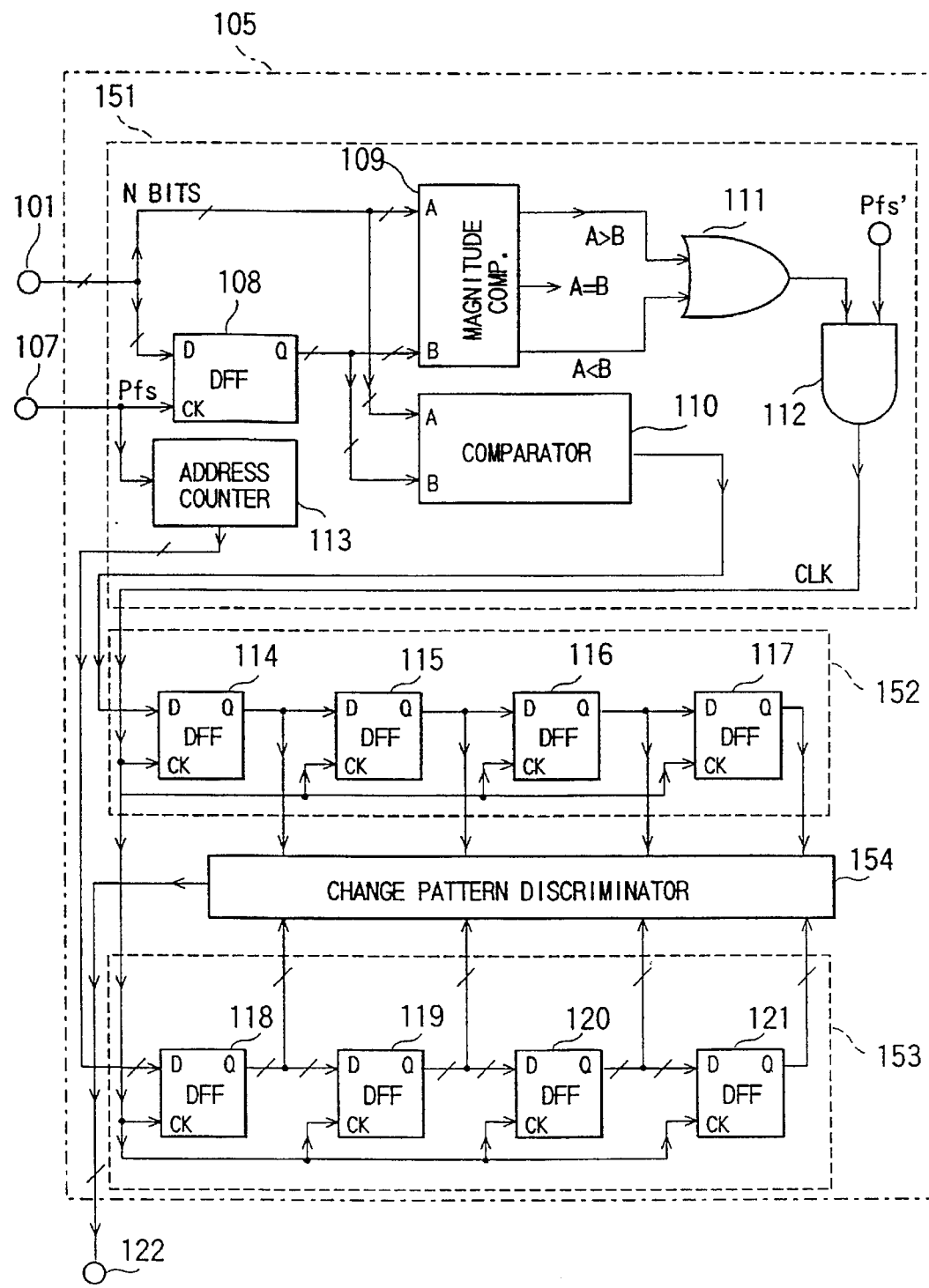
FIG. 15 is a block diagram showing a more practical construction of a part of the apparatus shown in FIG. 14.

FIG. 14 is a block diagram showing an exemplary construction of the second embodiment of the signal processing apparatus by which the signal processing method according to the present invention can be realized. Further, FIG. 15 shows a practical construction example of a discriminator 105 shown in FIG. 14.

In FIG. 14, the reference numeral 101 denotes an input terminal of the N-bit codes (N-bit digital signals) to be processed. In the case where the N-bit digital signals are of serial data, a serial-parallel converter is provided at the front stage of the input terminal 101.

In FIG. 14, the N-bit digital signals supplied to the input terminal 101 are supplied to a delay circuit 103 and to the discriminator 105. On the other hand, clock pulses Pfs having the sampling frequency of the digital signals are supplied to the discriminator 105 through an input terminal 107.

The discriminator 105 discriminates the signal transition pattern of the N-bit digital signals to be processed, and transmits the discriminated result to an additional signal generator 106. On the basis of the discriminated results of the signal transition pattern supplied from the discriminator 105, the additional signal generator 106 executes predetermined calculations to generate the (M-N)-bit additional signals. The obtained additional signals are supplied to an adder 104. The adder 104 adds the (M-N)-bit additional signal to the N-bit digital signals (as the N-bit corresponding to higher significant bits of the M bits), and the obtained M-bit digital signals are outputted through an output terminal 102.

With reference to FIGS. 16A to 22, the construction and the operation of the second embodiment of the present invention will be explained hereinbelow.

FIG. 16A shows the digital values of the N-bit digital signals in analog form, in which the respective time points t1, t2, t3, . . . indicate the sequential sampling points and Ts indicates the sampling period. Until the time point t2, the same digital values are kept, and the digital value varies markedly at time point t3. This timing point t3 is referred to as a transition point. The digital value does not vary between the time points from t3 to t7, however, the digital value has a tendency to increase from the time point t3 to time point t26. On the other hand, the digital value has a tendency to decrease from time point t33 to time point t48. That is, the digital value will not vary between the transition point and the succeeding transition point.

FIG. 16B shows the waveform obtained by restricting the transition rate at the transition points shown in FIG. 16A down to the value corresponding to one LSB of the N-bit digital signals. In FIG. 16B, when the digital value increases at each transition point, the point is represented by [1] and when it decreases, the point is represented by [0].

Here, the transition status of the continuous transition points from h1 to h4 (shown in FIG. 16A) can be represented by [1], [1], [1], [1]. In the same way, the transition status of the continuous transition points from h2 to h5 (shown in FIG. 16A) can be represented by [1], [1], [1], [0]. On the other hand, four continuous transition points on the time axis can take 16 different patterns in all as 0000, 0001, 0010, 0011, 0100, 0101, 0110, 0111, 1000, 1001, 1010, 1011, 1100, 1101, 1110, 1111. In the present invention, the transition point patterns of the digital values are detected, and appropriate additional signals are generated according to the detected results.

With reference to FIG. 15, the practical construction and the operation of the discriminator 105 will be explained in further detail hereinbelow. In FIG. 15, the discriminator 105 is composed of an extractor 151 for extracting the transition points of the signal waveform, a pattern extractor 152 for extracting the transition point pattern of the signal waveform, an address generator 153 for detecting an address of the transition point of the signal waveform, and a pattern discriminator 154 for discriminating the transition pattern. The N-bit digital signals to be processed are supplied to the input terminal 101 (the same as the input terminal 101 shown in FIG. 14). The clock pulses Pfs are supplied to the input terminal 107. The clock pulses Pfs have a frequency the same as the sampling frequency used when the N-bit digital signals are generated. When the digital signals are audio digital signals, the frequency of the clock pulse signals Pfs is 44.1 KHz or 48 KHz, for instance.

The digital signals supplied to the extractor 151 through the input terminal 101 are given to an A-input terminal of a magnitude comparator 109, a data terminal of a DFF 108, and an A-input terminal of a comparator 110. Further, the clock pulses Pfs are given to a clock terminal of the DFF 108 through the input terminal 107. The DFF 108 delays the digital signals by one sampling period and outputs the delayed digital signals from a Q terminal thereof. The digital signals outputted by the DFF 108 are supplied to a B-input terminal of the magnitude comparator 109 and a B-input terminal of the comparator 110.

The magnitude comparator 109 compares the value of the N-bit digital data A supplied through the A-input terminal with the value of the N-bit digital data B supplied through the B-input terminal. When the value of the digital data A is larger than that of the digital data B, only the output terminal A>B is set to the high level. At this time, the other output terminals A<B and the terminal A=B are set to the low level. Further, when the value of the digital data A is equal to that of the digital data B, only the output terminal A=B is set to the high level. At this time, the other output terminals A>B and the terminal A<B are set to the low level. Further, when the value of the digital data B is larger than that of the digital data A, only the output terminal A<B is set to the high level. At this time, the other output terminals A>B and the terminal A=B are set to the low level.

The comparator 110 compares the value of the digital data A supplied through the A-input terminal with the value of the digital data B supplied through the B-input terminal being delayed by one sampling time. When the value of the digital data A is larger than the value of the digital data B, that is, when the transition points indicate an increase status in FIGS. 16A and 16B, a logical value [1] is generated, irrespective of the increase rate. Further, when the value of the digital data B is larger than the value of the digital data A, that is, when the transition points indicate a decrease status in FIGS. 16A and 16B, a logical value [0] is generated, irrespective of the decrease rate. The output of the comparator 110 is supplied to the data terminal of a DFF 114 of the pattern extractor 152.

The outputs of the terminals A>B and A<B of the magnitude comparator 109 are supplied to an OR circuit 111. The output of the OR circuit 111 is set to the high level when any one of the outputs of the output terminals A>B and A<B is set to the high level. The output signal of the OR circuit 111 is supplied to an AND circuit 112. Further, the signals Pfs' are supplied to the AND circuit 112 as a gate pulse. The gate pulses Pfs' are pulses having the same frequency as that of the clock pulses Pfs but 180-degrees out of phase from the clock pulses Pfs. Therefore, whenever the N-bit digital signal values vary, the AND circuit 112 outputs a clock pulse CLK at the timing of the gate pulse Pfs'. The clock pulses CLK outputted by the AND circuit 112 are supplied to clock terminals of DFFs 114 to 117 of the pattern extractor 152 and clock terminals of DFFs 118 to 121 of the address generator 153.

Address signals (data) outputted by an address counter 113 are supplied to a data terminal of the DFF 118 of the address generator 153. Therefore, whenever the clock pulse CLK outputted by the AND circuit 112 is at the high level, the DFF 118 reads the address value at the transition point from the data terminal thereof. The address value read by the DFF 118 is shifted through the DFFs 119 to 121 in sequence, whenever the clock pulse CLK varies to the high level. The address values outputted through the DFFs 118 to 121 are given to the pattern discriminator 154.

The DFFs 114 to 117 of the pattern extractor 152 shift the logical value outputted by the comparator 110 in sequence in accordance with the clock pulses CLK. Further, the DFFs 114 to 117 output a logical value [1] or [0] in correspondence to the transition in increase or decrease of the digital value of the digital signal on the time axis, to the Q outputs thereof. The logical value pattern obtained by these outputs is any one of the 16 types in all as 0000, 0001, 0010, 0011, 0100, 0101, 0110, 0111, 1000, 1001, 1010, 1011, 1100, 1101, 1110, and 1111. The outputs of the DFFs 114 to 117 are supplied to the pattern discriminator 154.

The pattern discriminator 154 is provided with 16 match circuits (not shown) corresponding to the above-mentioned 16 patterns. These 16 match circuits in total correspond to the 16 numerical values obtained by combinations of four transition points developed in sequence on the time axis, as already explained. The four digit values represented by the combinations of the logical values at four transition points given in sequence from the Q terminals of the DFFs 114 to 117 of the pattern extractor 152 are discriminated by these 16 match circuits with respect to the transition patterns. The four digit value is 1111 in the case of four transition points h1 to h4 or 0001 in the case of four transition points h6 to h9 shown in FIG. 16A, for instance.

Whenever the transition points appear on the time axis in sequence, at least one of the 16 match circuits of the pattern discriminator 154 outputs a match signal. The pattern discriminator 154 supplies a signal indicative of the types of the predetermined transition pattern corresponding to the match circuit now outputting a match signal (e.g., a numeral value set for the match circuit which outputs the match signal) and the address data indicative of the four transition points to the additional signal generator 106 through the output terminal 122.

The additional signal generator 106 generates an additional signal so that a predetermined interpolation can be made at the interval between the second and third transition points, in accordance with the discriminated transition point pattern of the 16 patterns and in relation to the already executed interpolation at the interval between the first and second transition points of the transition point group of the first to third transition points.

When the N-bit digital signals are transformed into M-bit digital signals, the generated additional signals are (M-N)-bit digital signals.

Figure 16D:
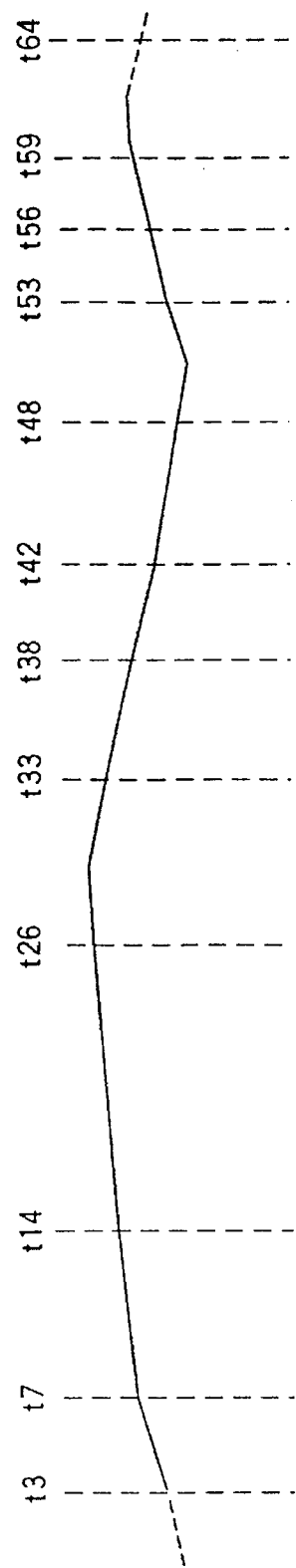

The additional signals are such (M-N)-bit signals that a linear interpolation can be made for the waveform, as shown in FIG. 16C. In this waveform, the transition rates at the transition points of the N-bit digital signals are represented as one LSB. At the periods during which the linear interpolation is made, the additional signals are generated in such a way that the integral value of the waveform (shown in FIG. 16C) obtained by limiting the transition rates at the transition points of the N-bit digital signals down to one LSB can be equalized to the integral value of the waveform (shown in FIG. 16D) represented by the linearly-interpolated M-bit digital signals. The (M-N)-bit additional signals are the signals having amplitudes less than one LSB of the N-bit digital signals. The generated (M-N)-bit additional signals are added to the N-bit digital signals.

The additional signals can be generated easily using data indicative of the types of the transition patterns as the address signals and further by outputting data indicative of predetermined additional signals from a ROM table (not shown) provided in the additional signal generator 106, for instance.

FIGS. 17 to 24 show how to execute the linear interpolation in accordance with the transition patterns. The linear interpolation to be executed at the period between the second and third transition points in a transition point group is determined in relation to the linear interpolation already executed at the interval between the first and second transition points of that group. In each of these drawings, #1 to #4 represent four continuous transition points on the time axis. Further, the numeral arrangement, such as [1111], represents the transition of digital values at the four transition points of one transition point group developing in sequence on the time axis, by use of logical values [1] and [0], where [1]indicates an increase and [0] indicates a decrease.

The representation of convex and concave in the interpolation mode columns between #1 and #2 and between #2 and #3 represent that the interpolation mode is convex or concave (not linear) at the periods. Further, the numerals (e.g., 1 to 2 or 2.5 to 3, etc.) in the interpolation mode columns between #1 and #2 and between #2 and #3 represent that the linear interpolation is executed. Further, the representation of "–" in the interpolation mode column between #2 and #3 represents that the linear interpolation is not executed between #2 and #3. Further, when the interpolation is executed at the period including between #2 and #3, the interpolation is shown by a dashed line. Further, when the interpolation is executed at the period including between #1 and #2, the interpolation is shown by a solid line.

In each of FIGS. 17 to 24, only eight types of patterns (1111, 1110, 1101, 1100, 1011, 1010, 1000, and 1001) are shown as the combinations of the digital value transitions (an increase or decrease of the digital values) at the four transition points #1, #2, #3 and #4. However, the 16 types of patterns already explained can be obtained by combining the above-mentioned eight patterns and other eight patterns (in which [1] and [0] are reversed in the numerical arrangement in the above-mentioned eight patterns), in practice it is possible to cope with the 16 types of patterns by using only eight types of pattern data, as shown in FIGS. 17 to 24.

On the basis of the data indicative of the types of the transition point patterns, the additional signal generator 106 of FIG. 14 decides the linear interpolation mode as shown in FIGS. 17 to 24, for instance, in correspondence to the linear interpolation already-executed at the interval between the first and second digital value transition points of the present transition point group composed of four transition points or in correspondence to the linear interpolation already-executed at the interval between the second and third digital value transition points of the preceding transition point group composed of four transition points. The additional signal generator 106 executes the calculations so that the (M-N)-bit additional signals corresponding to the linear interpolation decided as described above can be generated.

In FIG. 14, the transition point address data are supplied from the discriminator 105 to the additional signal generator 106, together with the data indicative of the types of the transition patterns. Further, the transition point interval data required for calculation to generate the additional signals can be obtained by calculating the mutual differences between the four transition point address data.

Figure 25A:
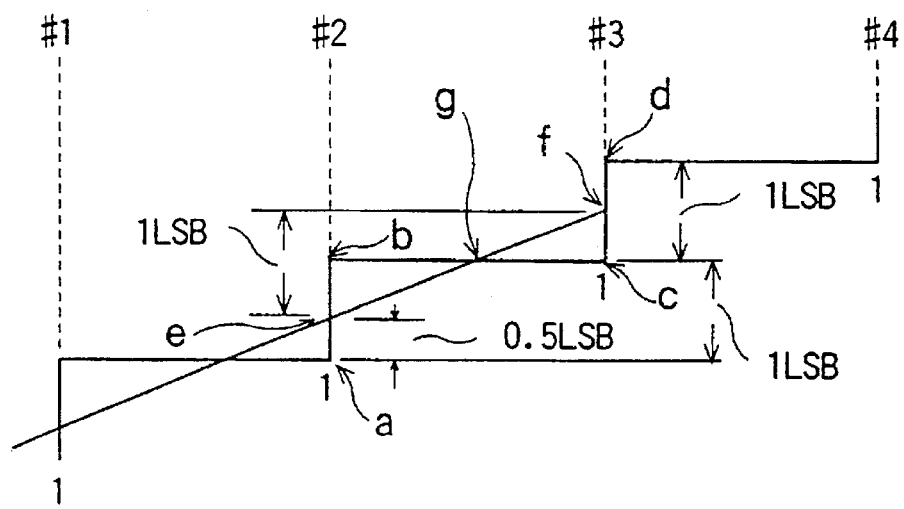
FIGS. 25A to 25D are waveform diagrams for assistance in explaining the operation of the second embodiment according to the present invention.
Figure 25B:
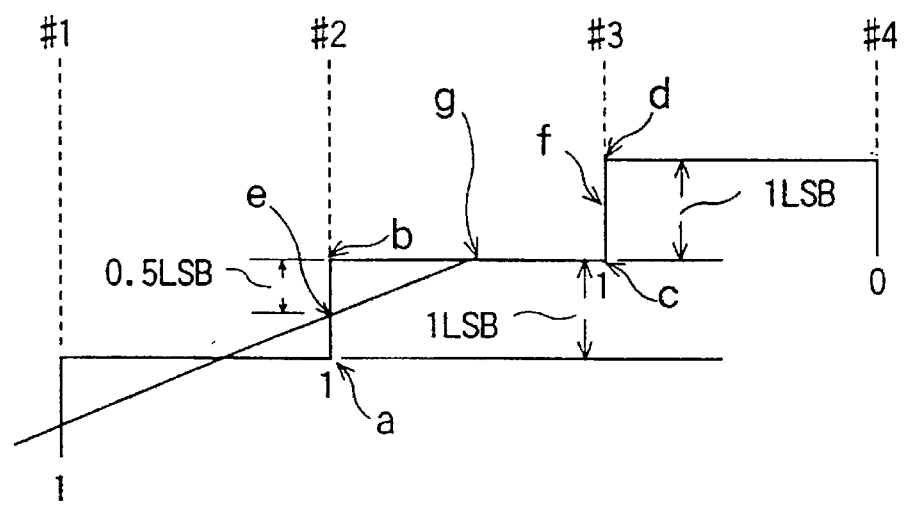
Figure 25C:
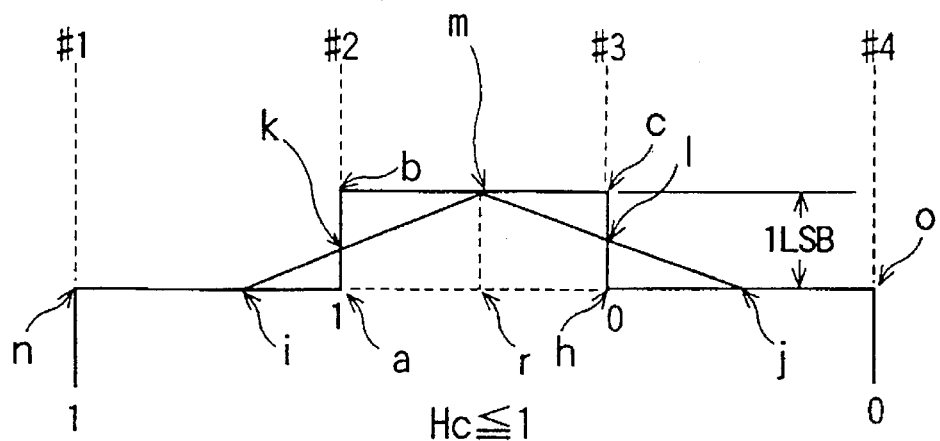
Figure 25D:
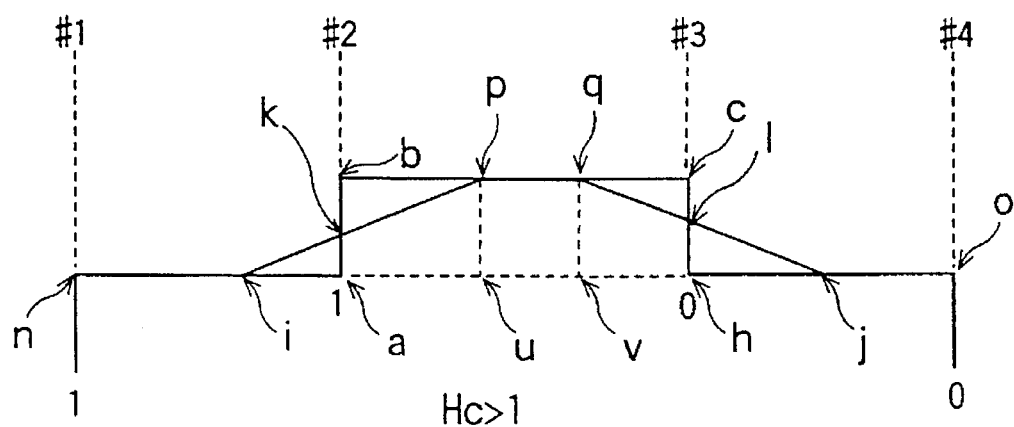

FIGS. 25A to 25D are diagrams for assistance in explaining how to decide the interpolation line to be obtained at the interval between the second and third digital value transition points of one transition point group. FIGS. 25A to 25D show four typical transition patterns formed by four transition points. In more detail, FIG. 25A shows an example of the transition pattern in which digital values at the four sequential transition points increase monotonously. FIG. 25B shows another example of the transition pattern in which digital values at the four sequential transition points first increase monotonously and then decrease. FIG. 25C shows another example of the transition pattern in which digital values at the four sequential transition points first increase and at once decrease (convex). FIG. 25D shows the other example of the transition pattern in which digital values at the four sequential transition points first increase, keep a constant level, and then decrease.

In FIGS. 25A to 25D, the linear interpolation to be executed for each transition pattern is shown by oblique solid lines in the drawings. Further, in the drawings, #1, #2, #3 and #4 represent the first to fourth transition points of the four continuous digital values on the time axis, respectively. Further, an increase in digital value at a transition point is represented by the logical value [1] and a decrease of the digital value at a transition point is represented by the logical value [0]. Further, the intervals between a and b, between c and d and between c and h correspond to one LSB or $\frac{1}{2}^N$ resolution (resolving power).

First, in FIG. 25A, the linear interpolation between the second transition point #2 and the third transition point #3 can be obtained by an oblique line e→g→f (e →f) obtained by connecting a midpoint e between a and b at the second transition point #2 with a midpoint f between c and d at the third transition point #3. Here, the height difference between the two midpoints e and f is equal to one LSB of the $\frac{1}{2}^N$ resolution. The gradient between the interpolation line e→f can be obtained by calculating (L/bc), where bc denotes the distance between the transition points #2 and #3 and L denotes the $\frac{1}{2}^N$ resolution or one LSB. Further, the distance bc can be obtained by a difference in address value between the second and third transition points #2 and #3.

Secondly, in FIG. 25B, the linear interpolation between the second and third transition points #2 and #3 can be obtained by an oblique line e→g. This oblique line is a part of the line obtained by connecting a midpoint e between a and b at the second transition point #2 with a midpoint f between c and d at the third transition point #3. The gradient between the interpolation line e→g can be obtained in the same way as with the case of the interpolation line between e and f shown in FIG. 25A.

Successively, in the case of the transition pattern as shown in FIG. 25C, a midpoint i between the transition points #1 and #2 and a midpoint j between the transition points #3 and #4 are both determined. Then, two lines im and mj are obtained in such a way that the rectangular area abch becomes equal to the triangular area imj having a base line ij. Here, the height of the formed triangular imj is denoted by Hc.

Since the area of the rectangle abch is 1×ah, and the area of the triangle imj is (ij×Hc)/2, Hc can be obtained as $$1 \times ah = (ij \times Hc)/2$$

$$Hc = 2 \times ah/ij$$

Since the point i is a midpoint between the transition points #1 and #2, and further since the point j is a midpoint between the transition points #3 and #4, the value Hc can be obtained easily on the basis of the address values of the transition points #1 to #4.

Here, two cases of Hc value can be considered as (1) Hc is equal to or smaller than 1 and (2) Hc is larger than 1.

In the case where Hc is equal to or smaller than 1, the position of the point m on the time axis, that is, the position of the point r is set to a point at which the line ah is divided by a ratio of the interval length between the transition points #1 and #2 and the interval length between the transition points #3 and #4. In other words, the period length (the number of sampling period Ts) of the line ar and the period length of the line rh can be obtained as $$ar = ah \times na/(na+ho)$$

$$rh = ah - ar$$

Therefore, the gradient of the line im and the gradient of the line mj are as follows:

Gradient of line $im = Hc/ir$

Gradient of line $mj = Hc/rj$

Further, the period lengths of the lines ir and rj can be obtained as $$ir = (na/2) + ar$$

$$rj = (ho/2) + rh$$

Secondly, when Hc is larger than 1, the linear interpolation is executed as shown in FIG. 25D. In FIG. 25D, the gradient of the line ip and the gradient of the line qj can be obtained as follows:

Gradient of line $ip = 1/iu$

Gradient of line $qj = 1/vj$

Further, the gradient of the line pq is 0.

Here, however, the points u and v shown in FIG. 25D are determined by the points p and q in such a way that the line segment ia is equal to the line segment au and further the line segment vh is equal to the line segment hj.

Further, the period lengths of the lines iu and vj in the above formulae can be obtained as follows:

$$iu = 2 \times (na/2) = na$$

$$vj = 2 \times (ho/2) = ho$$

$$uv = ah - (na/2) - (ho/2)$$

As explained above, the transition patterns expressed by the four sequential transition points #1, #2, #3 and #4 can be limited to only 16 types in total of the eight types as shown in FIGS. 17 to 24 and the other eight types whose transition patterns are opposite to those shown in FIGS. 17 to 24. The linear interpolation pattern to be executed at the interval between the second and third transition points #2 and #3 (of the four transition points #1, #2, #3 and #4) has four types for each of 16 types of the transition patterns, as shown in FIGS. 17 to 24 according to the linear interpolation already executed at the interval between the first and second transition points #1 and #2. In other words, although there exit 64 (16×4) types of linear interpolation patterns in total, the additional signal generator 106 can generate linear interpolation data easily, for each transition point group composed of four transition points, by the above-mentioned calculations, as explained above with reference to FIGS. 25A to 25D.

Figure 16E:
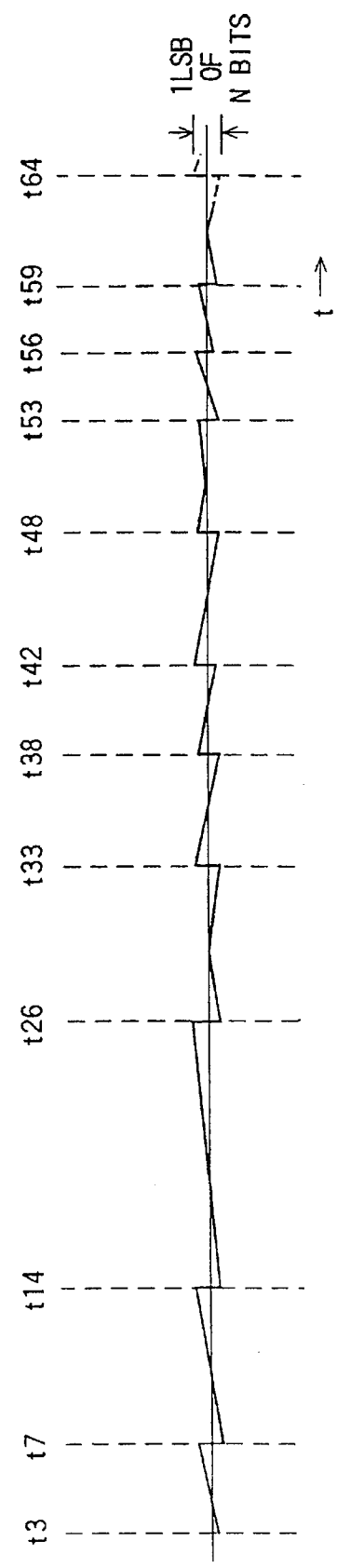
Figure 17:
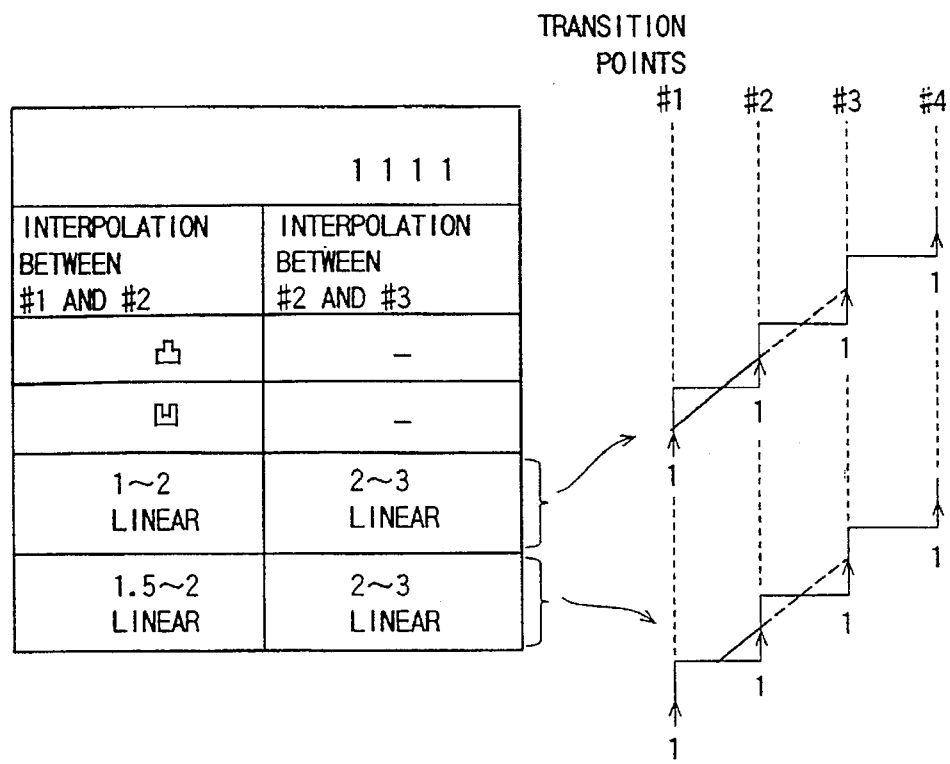
FIGS. 17 to 24 are tables and waveform diagrams for assistance in explaining the operation of the second embodiment according to the present invention.
Figure 18:
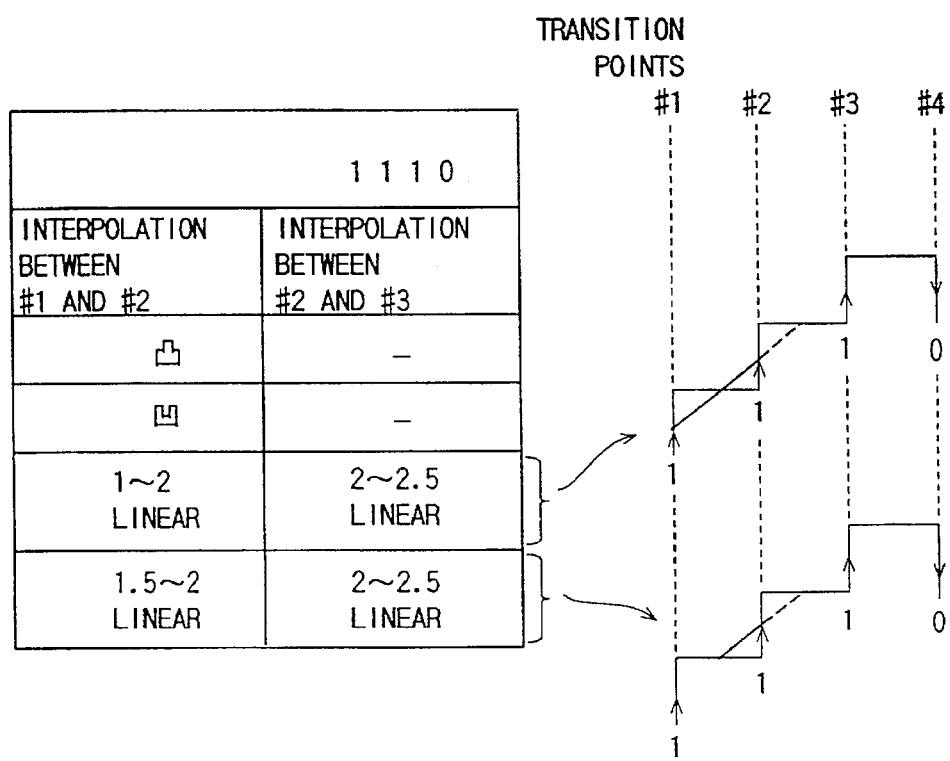
Figure 19:
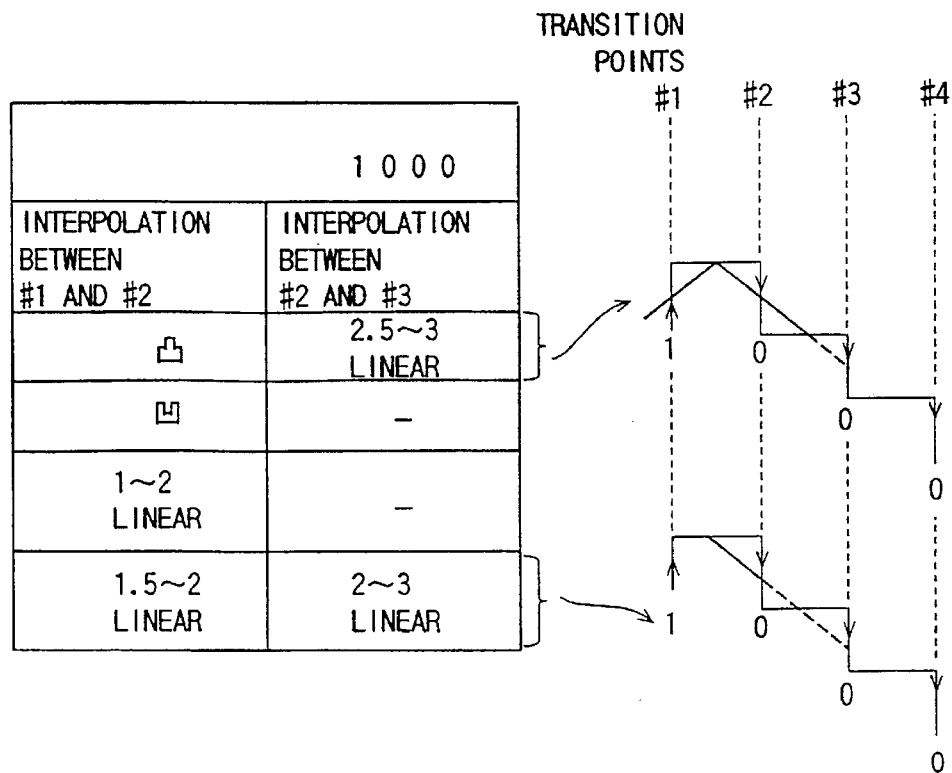
Figure 20:
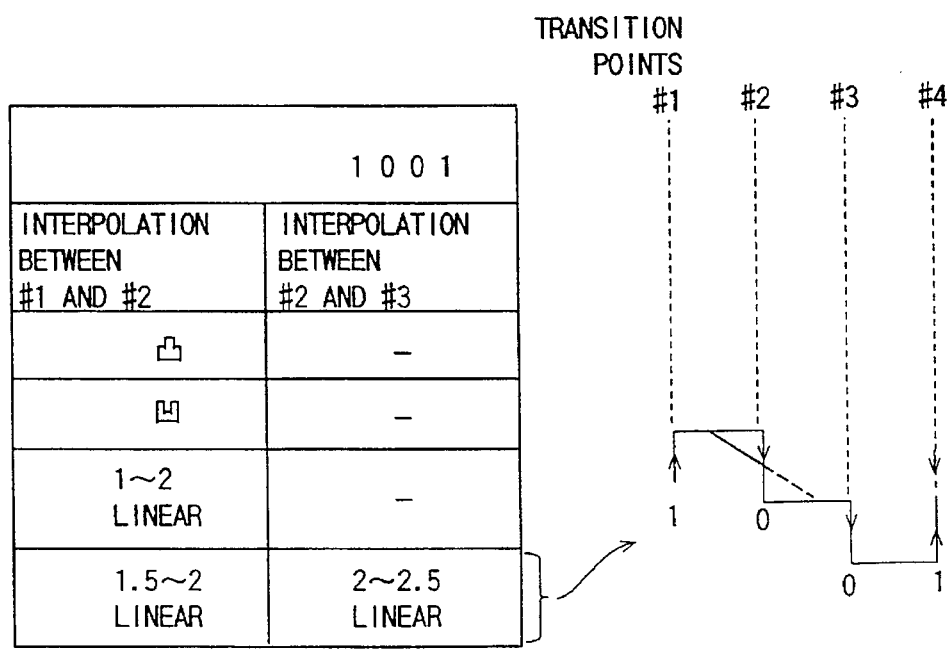
Figure 21:
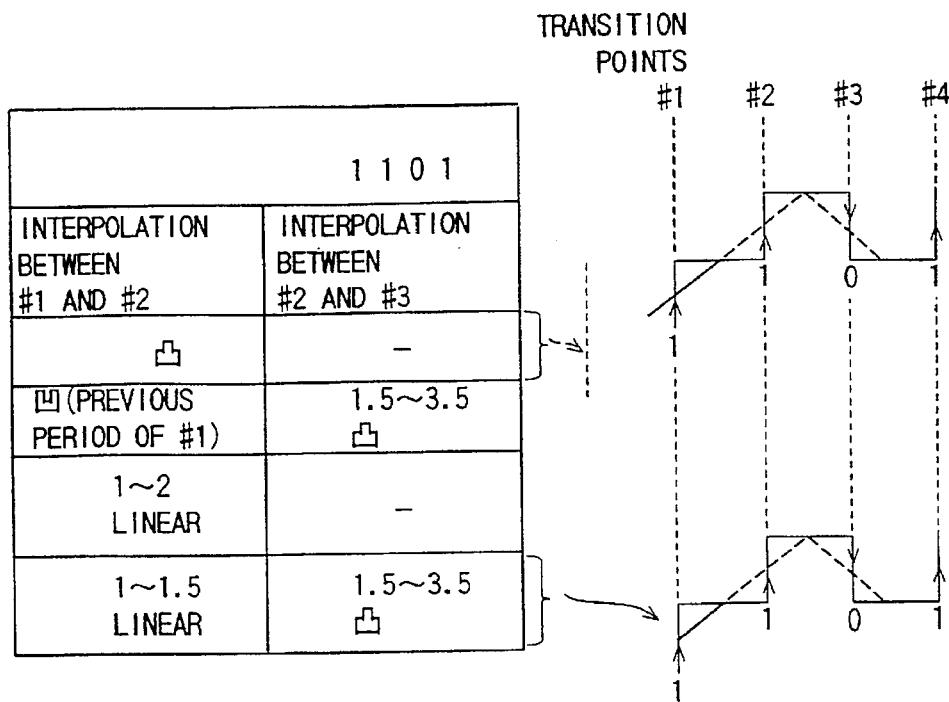
Figure 22:
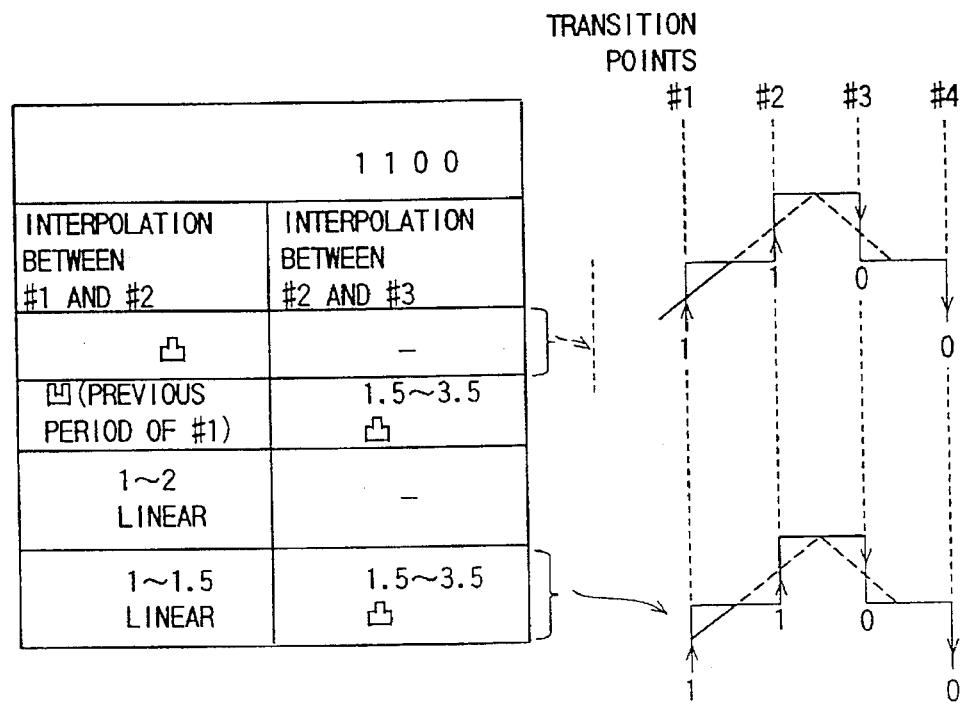
Figure 23:
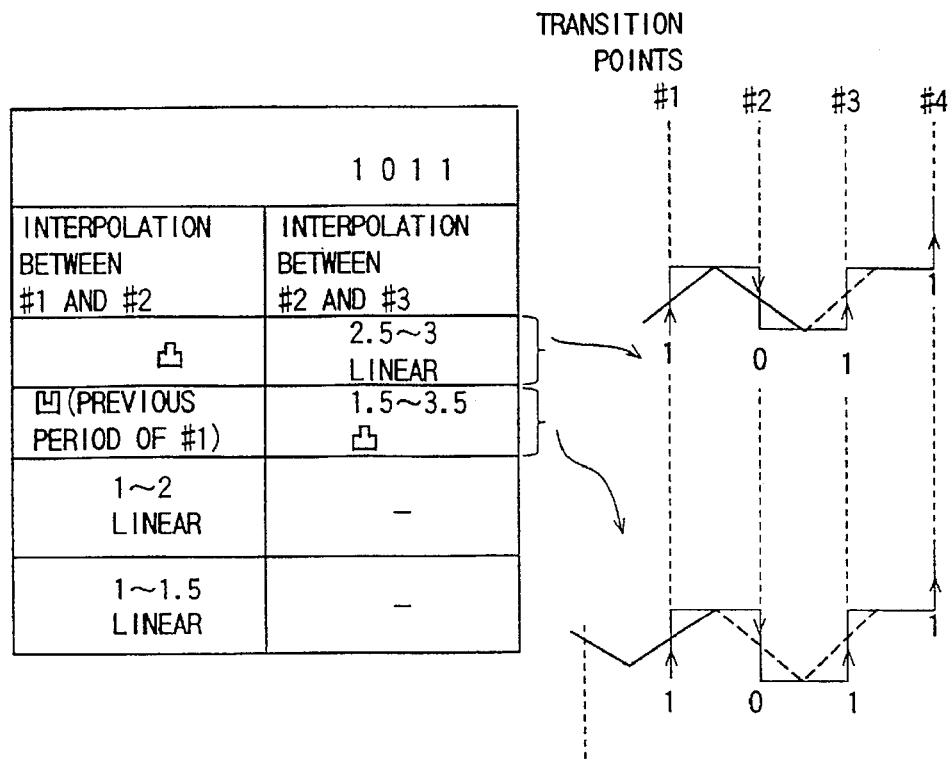
Figure 24:
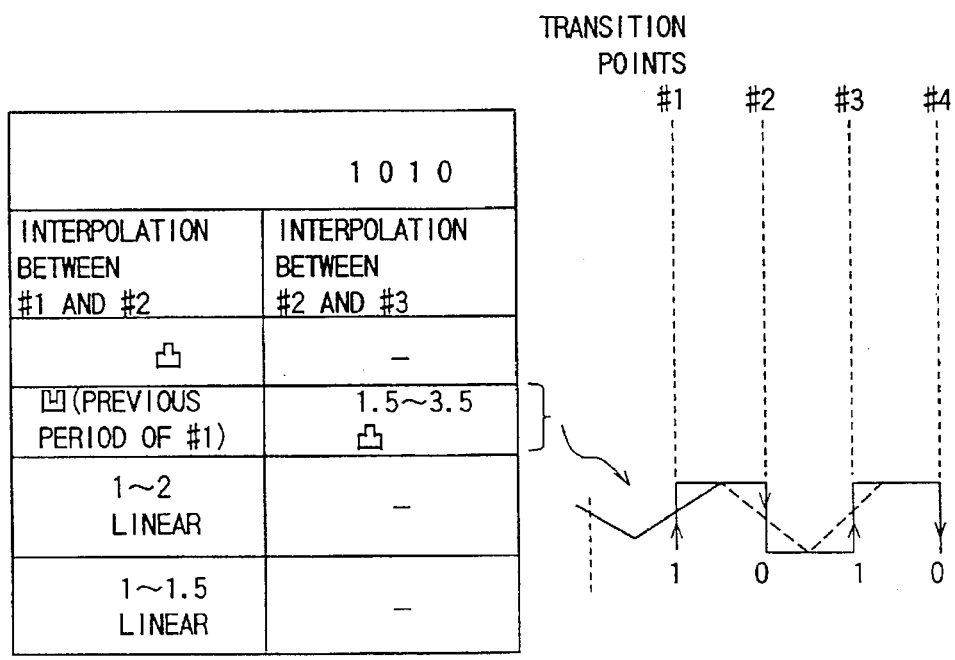
Figure 26:
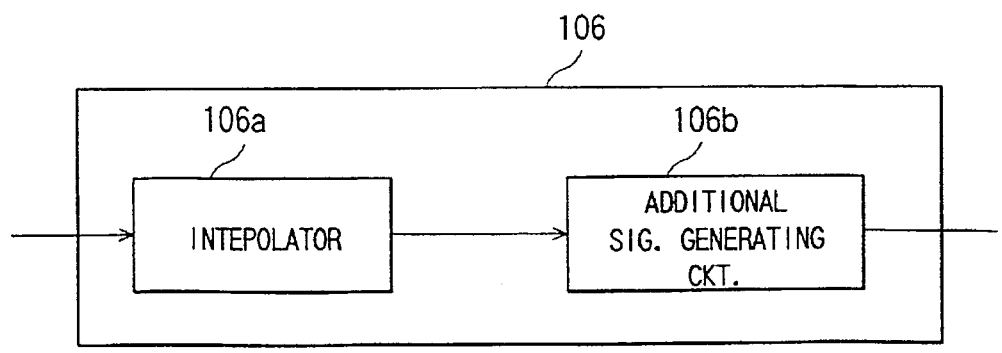
FIG. 26 is a block diagram showing a more practical construction of a part of the apparatus shown in FIG. 14.

As shown in FIG. 26, the additional signal generator 106 is constructed by including an interpolator (memory and microprocessor) 106a so that the linear interpolations as described above can be executed and an additional signal generating circuit 106b. The linear interpolation data obtained by the calculation and shown in FIG. 16D are stored in the memory in sequence. The linear interpolation data represents a signal waveform obtained by linearly interpolating the signal waveform as shown in FIG. 16C obtained under limitation of the transition rate at the digital signal transition points down to one LSB of the N-bit digital signals. The additional signals can be obtained in the additional signal generating circuit 106b by taking out the less significant (M-N) bits from the linear interpolation data outputted in sequence from the interpolation circuit 106a, which is (M-N)-bit digital data corresponding to a range of ±0.5 LSB of the N-bit digital signals as shown in FIG. 16E.

The generated additional signals are supplied to the adder 104 of FIG. 14. To the adder 104, N-bit digital signals delayed by a predetermined time by the delay circuit 103 are also supplied. Therefore, the adder 104 adds the additional signals to the original digital signals as the less significant bits, so that the added M-bit digital signals are to be outputted. The delay time of the delay circuit 103 is determined in such a way that the corresponding additional signals can be added to the N-bit digital signals supplied through the input terminal 101.

Figure 27:
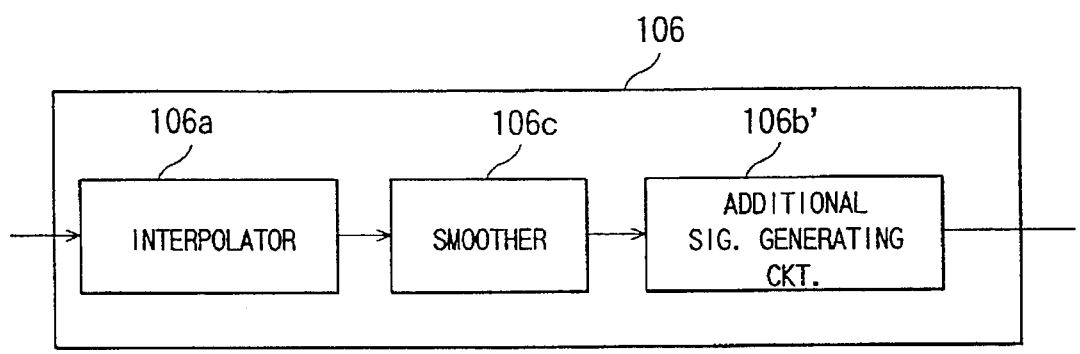
FIG. 27 is a block diagram showing a more practical construction of a part of the apparatus shown in FIG. 14.

As described above, when the generated additional signals are supplied to the adder 104, it is possible to obtain the M-bit digital data from the adder 104. Without being limited only thereto, however, it is also preferable to smooth the linearly interpolated data over a plurality of samples through a smoother 106c, as shown in FIG. 27. A smoother 106c is interposed between the interpolator 106a and an additional signal generating circuit 106b', to smooth the linearly interpolated data supplied by the interpolator 106a and further to supply the smoothed interpolated data to the additional signal generating circuit 106b'. That is, the additional signal generating circuit 106b' generates the (M-N)-bit additional signals on the basis of the smoothed interpolation data, and supplies the generated additional signals to the adder 104 of FIG. 14.

In more detail, when the sequential linear interpolation data are D1, D2, D3, D4. D5, D6. D7, . . . , the linear interpolation data D2 is determined as (D1+D2+D3)/3 and the linear interpolation data D3 is determined as (D2+D3+D4)/3, for instance. In other words, an average value of the linear interpolation data for three sampling periods is used as the linear interpolation data, in sequence. As described above, after the linear interpolation data have been smoothed, predetermined (M-N)-bit data are taken out.

Figure 28:
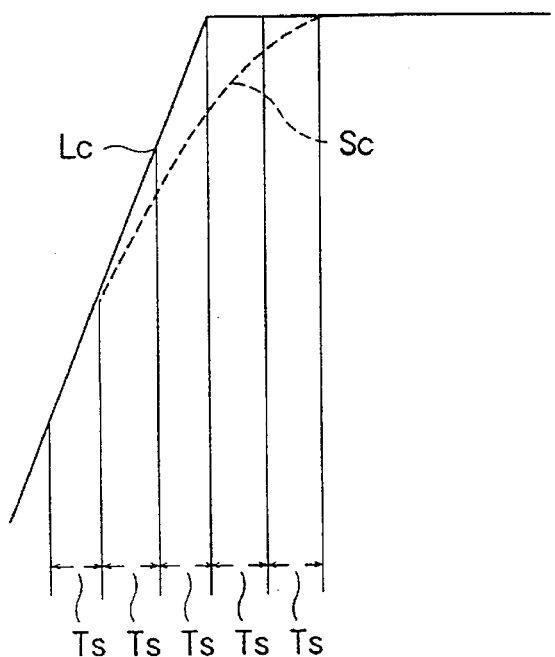
FIG. 28 is a waveform diagram for assistance in explaining the operation of the second embodiment according to the preset invention.

FIG. 28 shows the case where the average value of the linear interpolation data for four sequential sampling periods is used as the linear interpolation data for the sequential sampling period, by way of example. In FIG. 28, the interpolation line (shown by the solid line Lc) obtained by the original linear interpolation data can be smoothed as shown by the dashed curve Sc.

In the case of the smoothing processing, it is also preferable to vary the number of the sampling periods used for average calculation, according to the magnitude of the gradient of the interpolated line. For instance, when the gradient of the interpolation line is small, the number of the sampling periods used for average calculation is preferably increased. In contrast with this, when the gradient of the interpolation line is large, the number of the sampling periods used for average calculation is preferably reduced. Further, when the direction of the gradient of the interpolation line changes (into a convex or concave shape), the number of the sampling periods is preferably increased. When the number of the sampling periods is controlled according to the situation, it is possible to obtain more preferred results.

Further, in the case where the number of the sampling used for average changes according to the magnitude of the gradient of the interpolation line as described above, at the portion where the direction of the gradient of the interpolation line changes (in a convex or concave shape), the area of the portion enclosed by the interpolation lines becomes sometimes smaller than the rectangular area of the convex or concave portion enclosed by the lines of $\frac{1}{2}^N$ resolution (or one LSB). To overcome this problem, it is preferable to previously increase the Hc value (a height of the triangle) as explained with reference to FIG. 25C so that the area of the portion enclosed by the interpolation lines becomes equal to the rectangular area of the convex or concave portion enclosed by the lines of $\frac{1}{2}^N$ resolution (i.e., one LSB).

Figure 29:
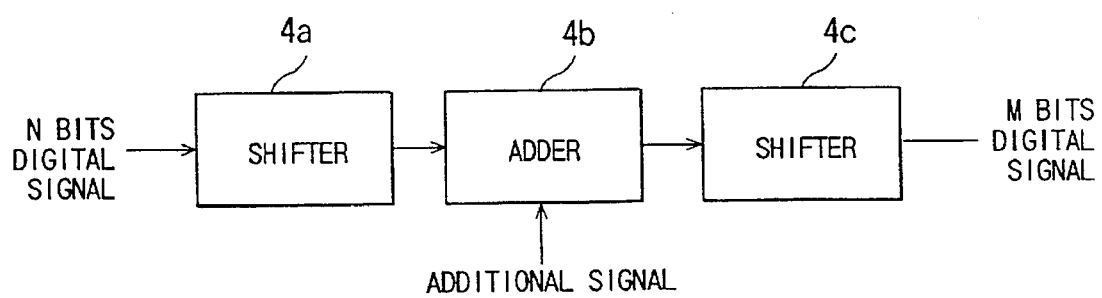
FIG. 29 a block diagram showing a construction of another embodiment for adding an additional signal to the digital signals.

FIG. 29 shows another embodiment for adding the additional signals to the N-bit digital signals. In the case of the adder 4 and the adder 104 of the first and second embodiments shown in FIGS. 7 and 14, respectively, the additional signals are added to the N-bit digital signals within a range of N-bits ±0.5 LSB. In the embodiment shown in FIG. 29, N-bit digital signals whose level is reduced down by one LSB through a level shifter 4a and the (M-N)-bit additional signals having an amplitude between zero and + one LSB are both supplied to an adder 4b. After these two signals have been added, the adder 4b supplies the added digital signals to a level shifter 4c. The level shifter 4c outputs the added digital signals whose level is reduced down by LSB/2 of the N bits, that is, by the 8 LSB of the M bits. The M-bit digital signals the same as with the case of the first and second embodiments can be obtained from the output of the level shifter 4c.

What is claimed is:

1. A signal processing method for transforming N-bit digital signals into M-bit digital signals, where M is larger than N, the N-bit digital signals being obtained by converting an analog signal into digital signals, the method comprising the steps of:

detecting transition points on a time axis and intervals between the transition points at which successive digital signals of the N-bit digital signals vary in value, and at least one interval length in accordance with the transition points;

generating (M-N) bit additional signals in the interval length in such a way that an integral value of a first analog value represented by the M-bit digital signals is substantially equal to an integral value of a second analog value represented by the N-bit digital signals and the first analog value is a value within a range of ±0.5 least significant bit of the N-bit digital signals with respect to the second analog value;

delaying the (M-N) bit additional signals so as to correspond to least significant bits of the N-bit digital signals; and combining the delayed (M-N) bit additional signals with the N-bit digital signals to generate the M-bit digital signals.

2. The signal processing method of claim 1, wherein the detecting step comprises the steps of:

detecting successive first, second and third transition points; and detecting a first interval length between the first and second transition points and a second interval length between the second and third transition points, and the generating step comprises the step of generating the additional signals so that the N-bit digital signals are linearly interpolated by the additional signals in a first signal processing period, the first signal processing period being from a midpoint of the first and second transition points and another midpoint of the second and third transition points when the first and second interval lengths are the same and transition directions in value of the digital signals at both the second and third transition points are the same or the first signal processing period corresponding to either of the first and second intervals which is shorter than the other and the transition directions at both the second and third transition points are the same, and generating the additional signals in a second signal processing period predetermined in accordance with the second interval length when the transition directions at the second and third transition points are different from each other, the additional signals being generated in the second signal processing period in such a way that the integral value of the first analog value represented by the M-bit digital signals is substantially equal to the integral value of the second analog value represented by the N-bit digital signals.

3. A signal processing apparatus for transforming N-bit digital signals into M-bit digital signals, where M is larger than N, the N-bit digital signals being obtained by converting an analog signal into digital signals, the apparatus comprising:

means for detecting transition points on a time axis and intervals between the transition points at which successive digital signals of the N-bit digital signals vary in value, and at least one interval length in accordance with the transition points;

means for generating (M-N) bit additional signals in the interval length in such a way that an integral value of a first analog value represented by the M-bit digital signals is substantially equal to an integral value of a second analog value represented by the N-bit digital signals and the first analog value is a value within a range of ±0.5 least significant bit of the N-bit digital signals with respect to the second analog value;

means for delaying the (M-N) bit additional signals so as to correspond to least significant bits of the N-bit digital signals; and means for combining the delayed (M-N) bit additional signals with the N-bit digital signals to generate the M-bit digital signals.

4. The signal processing apparatus of claim 3, wherein the detecting means comprises:

means for detecting successive first, second and third transition points; and means for detecting a first interval length between the first and second transition points and a second interval length between the second and third transition points, and the generating means comprises means for generating the additional signals so that the N-bit digital signals are linearly interpolated by the additional signals in a first signal processing period, the first signal processing period being from a midpoint of the first and second transition points and another midpoint of the second and third transition points when the first and second interval lengths are the same and transition directions in value of the digital signals at both the second and third transition points are the same or the first signal processing period being corresponding to either of the first and second intervals which is shorter than the other and the transition directions at both the second and third transition points are the same, and generating the additional signals in a second signal processing period predetermined in accordance with the second interval length when the transition directions at the second and third transition points are different from each other, the additional signals being generated in the second signal processing period in such a way that the integral value of the first analog value represented by the M-bit digital signals is substantially equal to the integral value of the second analog value represented by the N-bit digital signals.

5. The signal processing apparatus of claim 3, wherein the detecting means comprises:

means for delaying the N-bit digital signals by a specific sampling period carried by first clock signals to generate the successive digital signals;

means for comparing values of the generated successive digital signals to generate comparison signals when the values are not equal to each other;

means, responsive to the comparison signals and second clock signals 180 degree out of phase from the first clock signals, for generating transition point signals indicative of the transition points only when the values of the successive digital signals spaced by the specific sampling period are not equal to each other; and means, responsive to the first clock signals and the transition point signals, for counting a specific number of the first clock signals between successive transition points to detect the periods.

6. The signal processing apparatus of claim 5, wherein the generating means comprises:

means, responsive to the comparison signals and the transition point signals, for generating transition status signals synchronized with the transition point signals, the transition status signals being indicative of value transition of the successive digital signals at the transition points;

means for delaying the transition status signals by means of the transition point signals;

means, based on the delayed transition point signals, for generating extreme period signals indicative of periods for the N-bit digital signals in extreme value;

means for detecting differences in length of the periods;

means storing first (M-N) bit additional signals corresponding to the periods of extreme value and second (M-N) bit additional signals corresponding to periods of value transition;

means for reading the first (M-N) bit additional signals in response the differences in length and the extreme period signals;

means for reading the second (M-N) bit additional signals in response the transition status signals; and means for selectively outputting the read first and second (M-N) bit additional signals.

7. A signal processing method for transforming N-bit digital signals into M-bit digital signals, where M is larger than N, the N-bit digital signals being obtained by converting an analog signal into digital signals, the method comprising the steps of:

detecting transition patterns of successive digital signals of the N-bit digital signals over transition points on a time axis, at the transition points the successive digital signals varying;

generating (M-N) bit additional signals in such a way that an integral value of a first analog value represented by the M-bit digital signal is substantially equal to an integral value of a second analog value represented by the N-bit digital signals and the first analog value is a value within a range of ±0.5 least significant bit of the N-bit digital signals based on the transition patterns;

combining the (M-N) bit additional signals with the N-bit digital signals so that the (M-N) bit additional signals correspond to least significant bits of the N-bit digital signals to generate the M-bit digital signals.

8. The signal processing method of claim 7, wherein the detecting step comprises the steps of:

detecting successive first, second, third and fourth transition points at which two successive digital signals vary in value; and detecting transition patterns represented by the detected four transition points, and the generating step comprises the step of generating interpolation signals in accordance with the detected transition patterns so that a linear interpolation is executed to modified digital signals within a range of ±0.5 least significant bits between the second and third transition points in correspondence to another linear interpolation already executed between the first and second transition points, the modified digital signals being obtained by limiting an N-bit digital signal value at a transition point between the second and third transition points down to one least significant bit, thus generating (M-N) bit additional signals based on the generated interpolation signals.

9. A signal processing apparatus for transforming N-bit digital signals into M-bit digital signals, where M is larger than N, the N-bit digital signals being obtained by converting an analog signal into digital signals, the apparatus comprising:

means for detecting transition patterns of successive digital signals of the N-bit digital signals over transition points on a time axis, at the transition points the successive digital signals varying;

means for generating (M-N) bit additional signals in such a way that an integral value of a first analog value represented by the M-bit digital signals is substantially equal to an integral value of a second analog value represented by the N-bit digital signals and the first analog value is a value within a range of ±0.5 least significant bit of the N-bit digital signals based on the transition patterns; and means for combining the (M-N) bit additional signals with the N-bit digital signals so that the (M-N) bit additional signals correspond to least significant bits of the N-bit digital signals to generate the M-bit digital signals.

10. The signal processing apparatus of claim 9, wherein the detecting means comprises:

means for detecting successive first, second, third and fourth transition points at which two continuous digital signals vary in value; and means for detecting transition patterns represented by the detected four transition points, and the generating means comprises means for generating interpolation signals in accordance with the detected transition patterns so that a linear interpolation is executed to modified digital signals within a range of ±0.5 least significant bits between the second and third transition points in correspondence to another linear interpolation already executed between the first and second transition points, the modified digital signals being obtained by limiting an N-bit digital signal value at a transition point between the second and third transition points down to one least significant bit, thus generating (M-N) bit additional signals based on the generated interpolation signals.

11. The signal processing apparatus of claim 9, wherein the detecting means comprises:

means for delaying the N-bit digital signals by a specific sampling period carried by first clock signals to generate the successive digital signals;

means for comparing values of the generated successive digital signals to generate comparison signals and transition status signals indicative of increase or decrease in value at the transition points when the values are not equal to each other;

means, responsive to the comparison signals and second clock signals 180 degree out of phase from the first clock signals, for generating transition point signals indicative of the transition points only when the values of the successive digital signals spaced by the specific sampling period are not equal to each other;

means for counting the first clock signals to generate count signals;

means for synchronizing the transition status signals and the count signals with the transition point signals; and means, responsive to the synchronized transition status signals and count signals, for generating transition patterns of the successive digital signals.

12. The signal processing apparatus of claim 11, wherein the generating means comprises:

means for detecting differences between the transition points on the time axis using the count signals and the transition point signals;

means for conducting a specific linear interpolation to the N-bit digital signals based on the differences and the transition pattern signals; and means for taking least significant (M-N) bits from the interpolated N-bit digital signals to generate the (M-N) bit additional signals.

13. The signal processing apparatus of claim 12, wherein the conducting means conducts the linear interpolation per four successive transition points.

14. The signal processing apparatus of claim 12, wherein the conducting means comprises:

means for generating interpolation signals for transition point group each including specific number of successive transition points;

means for averaging the interpolation signals; and means for applying the averaged interpolation signals to conduct the linear interpolation to the N-bit digital signals.

* * * * *